US008895093B2

(12) United States Patent
Krnic et al.

(10) Patent No.: US 8,895,093 B2
(45) Date of Patent: Nov. 25, 2014

(54) METHOD FOR THE PRODUCTION OF JELLY CONFECTIONERY

(75) Inventors: Peter Krnic, Ringwood (AU); Paul Truman, Ringwood (AU); Darren Bates, Castaways Beach (AU); Kamaljit Singh Vilkhu, Werribee (AU); Lloyd Kenneth Simons, Werribee (AU)

(73) Assignee: Cadbury Enterprises PTE Limited, Jurong (SG)

( * ) Notice: Subject to any disclaimer, the term of this patent is extended or adjusted under 35 U.S.C. 154(b) by 1044 days.

(21) Appl. No.: 12/937,654

(22) PCT Filed: Apr. 14, 2009

(86) PCT No.: PCT/AU2009/000454
§ 371 (c)(1),
(2), (4) Date: Apr. 28, 2011

(87) PCT Pub. No.: WO2009/126993
PCT Pub. Date: Oct. 22, 2009

(65) Prior Publication Data
US 2011/0217432 A1 Sep. 8, 2011

(30) Foreign Application Priority Data

Apr. 14, 2008 (AU) .............................. 2008901838
Dec. 24, 2008 (AU) .............................. 2008906651

(51) Int. Cl.
*A23G 3/34* (2006.01)
(52) U.S. Cl.
USPC .......................................... 426/238; 426/512
(58) Field of Classification Search
USPC ......... 426/231, 389, 515, 238, 247, 660, 573, 426/512
See application file for complete search history.

(56) References Cited

U.S. PATENT DOCUMENTS

| 4,563,363 A | 1/1986 | Yoon |
| 6,242,028 B1 * | 6/2001 | Bean .............................. 426/515 |
| 6,242,035 B1 | 6/2001 | Clark et al. |
| 6,431,849 B1 | 8/2002 | Capodieci |
| 6,592,928 B2 | 7/2003 | Makela et al. |
| 2005/0260317 A1 | 11/2005 | Cotten et al. |
| 2005/0260329 A1 | 11/2005 | Yusuf et al. |
| 2006/0198930 A1 | 9/2006 | Royo et al. |
| 2007/0148285 A1 | 6/2007 | Yang |
| 2007/0148292 A1 | 6/2007 | Royo et al. |
| 2007/0196548 A1 | 8/2007 | Schmidt et al. |
| 2007/0269577 A1 | 11/2007 | Pershad et al. |

FOREIGN PATENT DOCUMENTS

| EP | 0252306 B1 | 3/1990 | |
| EP | 0264628 B1 | 6/1991 | |
| FR | 2604063 A1 * | 3/1988 | ............... A21B 3/18 |
| WO | WO 2006014227 A2 * | 2/2006 | .............. B29C 33/44 |
| WO | 2009126992 A1 | 10/2009 | |

OTHER PUBLICATIONS

FR2604063 Eng. translation pp. 1-3; Alain, Scotto; Sep. 22 1986.*

(Continued)

*Primary Examiner* — Steven Leff
(74) *Attorney, Agent, or Firm* — Hoffmann & Baron, LLP

(57) ABSTRACT

A method for making a jelly confectionery comprising preparing a liquid jelly confectionery composition comprising bulk sweetener and a hydrocolloid gelling agent, cooking the liquid jelly confectionery composition, and depositing the liquid jelly confectionery composition into a mold, wherein the viscosity of the liquid jelly confectionery composition is temporarily modified for a period of time commencing prior to deposition of the liquid jelly confectionery into a mold.

18 Claims, 21 Drawing Sheets

(56) References Cited

OTHER PUBLICATIONS

Bates, Dr. Darren, "High Power Ultrasonic Processing for the Food Industry: A Sound Technology for the Future", 2012, 32 pages.

Poppe, Jan et al. "Gelatine and Jelly Confectionery"; Manufacturing Confectioner; (1985); vol. 65, No. 11; (6) pages.

Maksimov, A. S. et al. "Rheology of Confectionery Masses Under Vibration"; Izvestiya Vysshikh Uchebnykh Zavedenii, Pishchevaya Tekhnologiya; (1976) No. 6; pp. 108-111; FSTA Accession No. 1977(11):L0846.

Freundlich, H. et al. "The Influence of Ultrasonic Waves on the Viscosity of Colloidal Solutions"; Trans Faraday Soc. ; (1938); vol. 34; (12) pages.

International Search Report; International Application No. PCT/AU2009/000454; Date of Mailing: Jul. 7, 2009; 3 pages.

International Search Report; International Application No. PCT/AU2009/000453; Date of Mailing: Jun. 29, 2009; 3 pages.

* cited by examiner

METHOD FOR THE PRODUCTION OF JELLY CONFECTIONERY

This application is a U.S. national stage of application No. PCT/AU2009/000454, filed on Apr. 14, 2009, the disclosure of which is incorporated herein by reference in its entirety.

FIELD

The present application relates to the production of jelly confectionery. The present invention also relates to new jelly confectionery compositions.

BACKGROUND

Jelly confectionery is a broad expression used to refer to a class of confectionery made from a bulk sweetener such as sugar, glucose, a sugar-substitute or a mixture thereof, and a hydrocolloid gelling system which imparts setting properties on the confection. Typical hydrocolloids include pectin, agar-agar, gelatine, gum, starch and combinations thereof.

Jelly confectionery is typically prepared by cooking the ingredients (with the exception of acids, colour and flavour) to the required temperature or the required solids content, cooling the hot fluid composition to a deposition temperature, adding acid, colour and flavour, depositing the jelly confectionery into a mould and cooling and conditioning the moulded product.

Deposition of the jelly confectionery involves pumping a measured quantity of the hot jelly into a mould. One problem that arises during deposition of the hot jelly confectionery material is that the flow of material can be difficult to stop, which leads to "tailing". This can be a particular problem if higher solids are used during jelly confectionery depositing, or if low depositing temperatures are used. Higher solids contents and lower temperatures tend to make the liquid confectionery material more viscous. As well as creating poorly shaped products due to tailing, higher solids contents can also give rise to processing difficulties, including premature gelling in the case of some gelling agents and possible blockage of lines in the depositor or other process equipment.

Centre-filled jelly confectionery is prepared by co-depositing a centre filling within an outer jelly shell in a "one-shot depositor" or similar equipment. The problems of tailing and processing difficulties described above can be even greater in the production of centre-filled jelly confectionery from two different confectionery materials, each of which can be subject to tailing and processing difficulties.

One problem that can arise with the production of centre-filled jelly confectionery is that "leakers" can be produced, if the inner filling has a tail that extends through the outer jelly shell. Current techniques for preventing this problem from occurring include reducing the viscosities of the outer confectionery material and centre-filling, and depositing the centre-filling in a position so that it sinks or rises to be located in the centre of the shell, to avoid leakage. It is also known to match the density of the two components. However, reducing the viscosity by reducing the solids content increases the time taken to dry and condition the product. Such controls are not always sufficient to avoid leakage, and there is a need for new techniques to address this problem.

There is also an interest in the confectionery industry to develop new and interesting confectioneries.

SUMMARY OF THE INVENTION

According to one embodiment, there is provided a method for making a jelly confectionery comprising:

preparing a liquid jelly confectionery composition comprising bulk sweetener and a hydrocolloid gelling agent,
cooking the liquid jelly confectionery composition, and
depositing the liquid jelly confectionery composition into a mould,
wherein the viscosity of the liquid jelly confectionery composition is temporarily modified for a period of time commencing prior to deposition of the liquid jelly confectionery into a mould.

The temporary modification of the viscosity suitably persists during the time of deposition of the liquid jelly confectionery composition into the mould. The temporary modification of the viscosity is suitably a temporary reduction in the viscosity. The temporary modification or reduction in viscosity is suitably based on a specific solids content of the liquid jelly confectionery composition, without change of the solids content of the liquid jelly confectionery composition. Changing the solids content is to be understood as resulting in a non-temporary change in the viscosity of the liquid jelly confectionery composition. The modification of the viscosity also needs to take place without disturbing the functionality of the hydrocolloid gelling agents.

The application of ultrasound frequency vibrational energy to the liquid jelly confectionery composition, referred to briefly as "ultrasonic treatment", is a suitable technique for modifying the viscosity of the liquid jelly confectionery composition. The ultrasonic treatment provides a temporary change in viscosity, such as a reduction in viscosity, which can be utilised to manage the viscosity of the liquid at suitable times in the method for making jelly confectionery. This technology allows for higher solids depositing based on a temporary viscosity reduction. Further, it has been found that this can be achieved on jelly confectionery compositions containing hydrocolloid gelling agents without the ultrasonic energy disturbing the functionality of the hydrocolloid.

Thus, according to one embodiment, there is provided a method for making a jelly confectionery comprising:
preparing a liquid jelly confectionery composition comprising bulk sweetener and a hydrocolloid gelling agent,
cooking the liquid jelly confectionery composition, and
depositing the liquid jelly confectionery composition into a mould,
wherein ultrasound frequency vibrational energy is applied to the liquid jelly confectionery composition prior to deposition.

According to one embodiment, the jelly confectionery composition is a centre-filled jelly confectionery. The ultrasonic frequency vibrational energy is applied to the liquid jelly confectionery composition forming the outer shell of the centre-filled jelly confectionery, however it may also be applied to the centre filling composition prior to deposition.

According to one embodiment, there is provided a centre-filled jelly confectionery comprising
a centre filling,
a casing, and
a backing layer, wherein the backing layer has a
different visual appearance compared to the casing.

According to this embodiment, the casing and the backing layer have a different visual appearance, such as a different colour, a different colour intensity, or another form of "visual effect" (such as shimmer, shine, sparkle or pearlescence). The difference may be a combination of these. Such a product provides new and interesting visual effects. As an example, a non-colour based visual effect agent, such as a shimmering agent, can be used in either the casing or in the backing layer. When the confectionery piece is bitten, a new, interesting design with a shimmer in either the casing or the backing layer will be observed. In another variant, the casing may be a foamed casing, and the backing layer is a coloured, translucent backing layer, providing an interesting opaque appearance with a glossy coloured area on one side. When bitten, the coloured filling is also observed coming out of the opaque casing. In a further variant, the casing may be coloured to a light colour intensity, and the backing layer may be coloured to a deeper intensity of the same colour, a close colour, or a different colour. This provides yet another interesting visual effect, providing a distinctive, rich and luxurious product. In yet a further variant, the casing may be in the form of a "starlight" pattern, and the backing layer can be in a different, single-colour/visual effect design (such as a single colour, or a glitter effect). Generally it is desired for the filling to be visible through the coloured casing, although it may not be visible through the backing layer, which is deeper in colour. According to one embodiment, the backing layer is not a foamed backing layer.

The application of an additional layer of the jelly confectionery material as a backing layer in each of these designs provides an additional layer to seal any pathway (eg. tail) of the coloured centre filling through the casing.

According to one embodiment, there is provided a centre-filled jelly confectionery comprising
a coloured centre filling,
a casing comprising a colouring agent, and
a backing layer comprising said colouring agent of the casing,
   wherein the concentration of said colouring agent in the backing layer is greater than in the casing.

According to another embodiment, there is provided a centre-filled jelly confectionery comprising
a coloured centre filling,
an uncoloured casing, and
a coloured backing layer.

According to this embodiment, the coloured backing layer contains colour, but is translucent, rather than opaque. The coloured backing layer is applied to one side of the uncoloured casing. It has been found by the applicant that by applying only a layer of coloured jelly confectionery material to the product over an uncoloured, colourless or substantially colourless casing, an attractive luminescence or coloured sheen is provided to the product. Moreover, the application of an additional layer of the outer jelly confectionery material (coloured) provides an additional layer to seal any pathway (eg. tail) of the coloured centre filling through the casing.

According to a further embodiment, there is also provided a method of managing the viscosity of a liquid jelly confectionery composition used to form a jelly confectionery, the method comprising applying ultrasonic frequency vibrational energy to the liquid jelly confectionery composition for at least a portion of time during jelly confectionery manufacture.

According to another embodiment, there is provided a method for making centre-filled jelly comprising:
a centre filling,
a jelly casing, and
a jelly backing layer, applied to one side of the jelly casing;
the method comprising:
preparing a liquid jelly confectionery composition comprising bulk sweetener and a hydrocolloid gelling agent,
cooking the liquid jelly confectionery composition,
dividing the cooked liquid jelly confectionery into at least two streams,
applying ultrasound frequency vibrational energy to the liquid jelly confectionery composition used to form the jelly casing prior to depositing,
depositing the first stream of liquid jelly confectionery composition with into a mould,
depositing a centre filling into the mould so that the is deposited first stream of liquid jelly confectionery composition forms a casing around the centre filling, and
applying a jelly backing layer formed from the second stream of liquid jelly confectionery composition to the deposited product to form the centre-filled jelly.

The steps of depositing the first stream of liquid jelly confectionery composition and the centre filling may comprise co-depositing the first stream of liquid jelly confectionery composition with a coloured centre filling into a mould, with the liquid jelly confectionery composition forming jelly casing around the centre filling.

According to one embodiment, the method comprises:
preparing a liquid jelly confectionery composition comprising bulk sweetener and a hydrocolloid gelling agent,
cooking the liquid jelly confectionery composition,
dividing the cooked liquid jelly confectionery into at least two streams,
applying ultrasound frequency vibrational energy to the liquid jelly confectionery composition used to form the jelly casing prior to co-depositing,
co-depositing the first stream of liquid jelly confectionery composition with a coloured centre filling into a mould, with the liquid jelly confectionery composition forming jelly casing around the centre filling, and
applying a jelly backing layer formed from the second stream of liquid jelly confectionery composition to the co-deposited product to form the centre-filled jelly.

BRIEF DESCRIPTION OF THE FIGURES

The present invention will now be described in further detail with reference to the accompanying figures, in which.

DETAILED DESCRIPTION OF THE INVENTION

Figure 1:
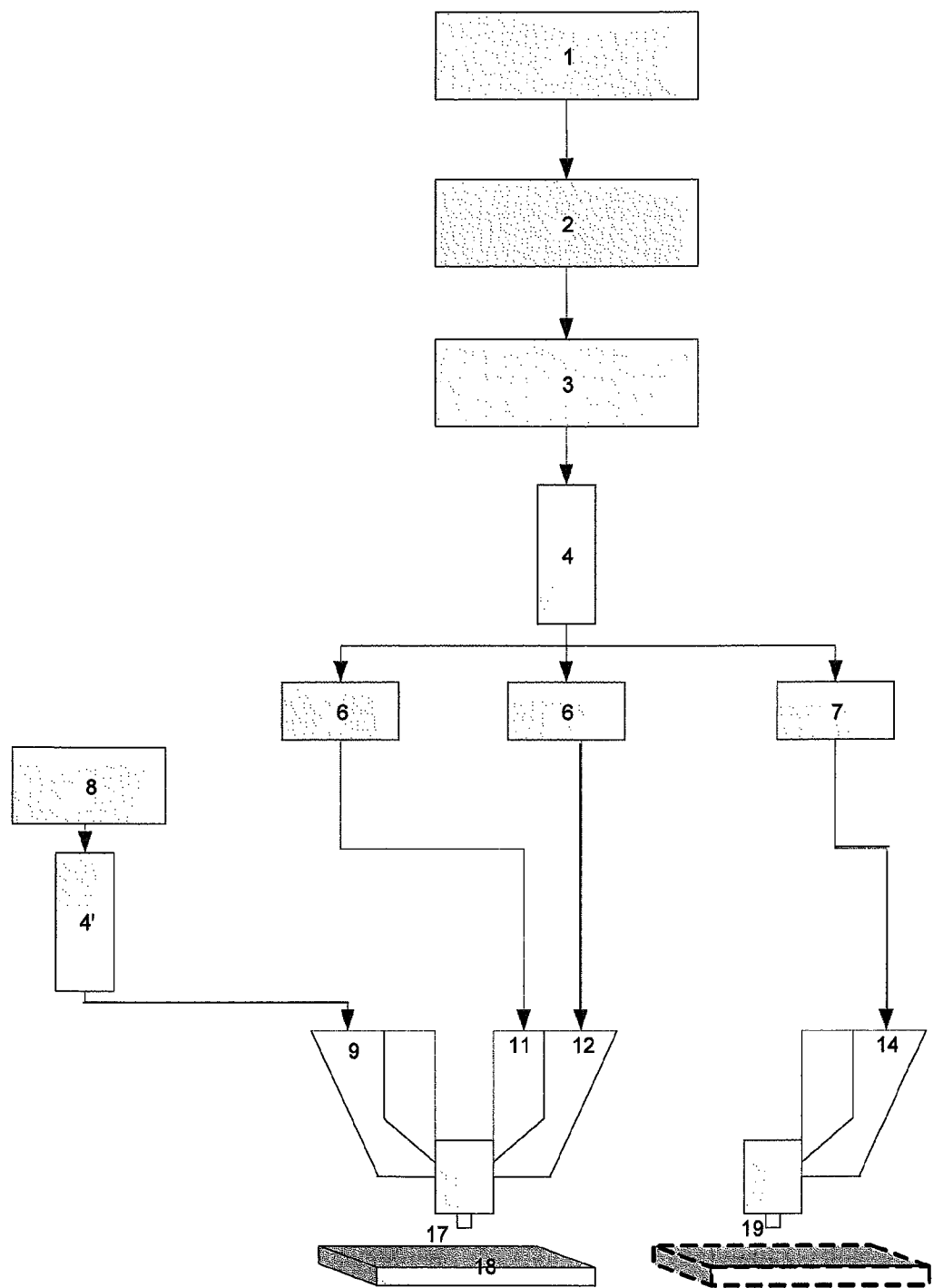
FIG. 1 illustrates schematically the process steps for making a jelly confectionery according to one embodiment of the invention.
Figure 2:
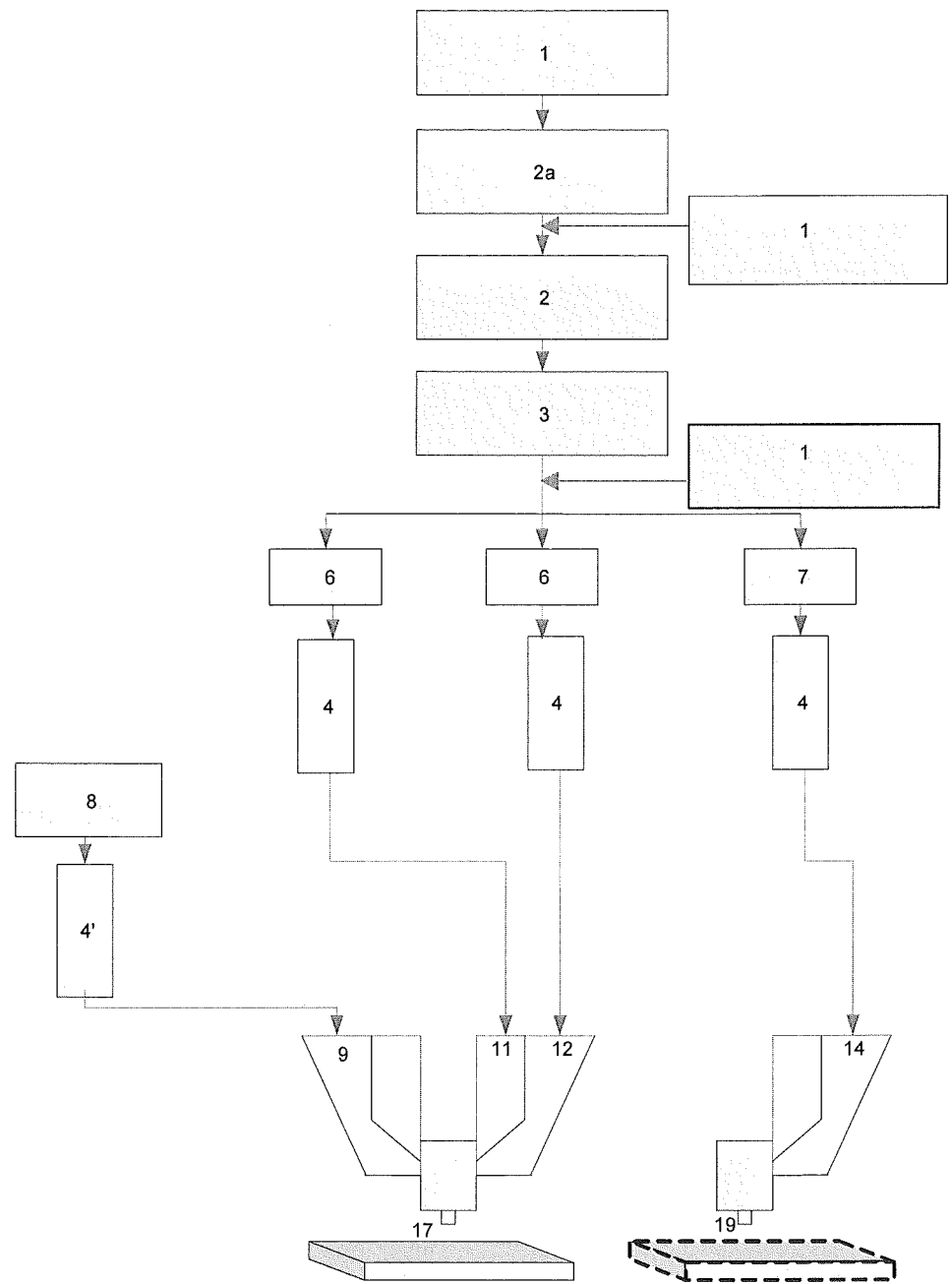
FIG. 2 illustrates schematically the process steps for making a jelly confectionery according to a second embodiment of the invention.
Figure 3:
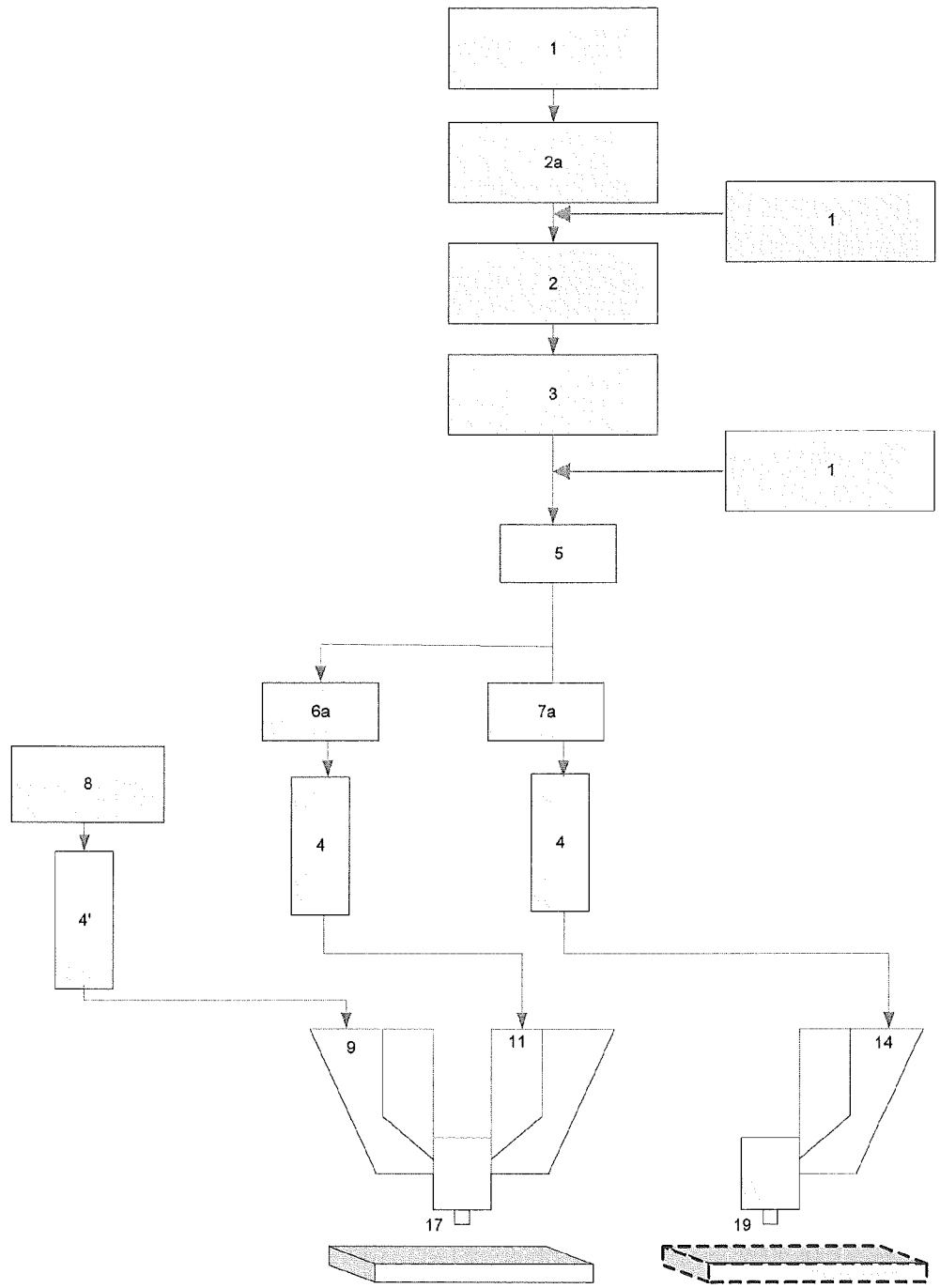
FIG. 3 illustrates schematically the process steps for making a jelly confectionery according to a third embodiment of the invention.
Figure 4:
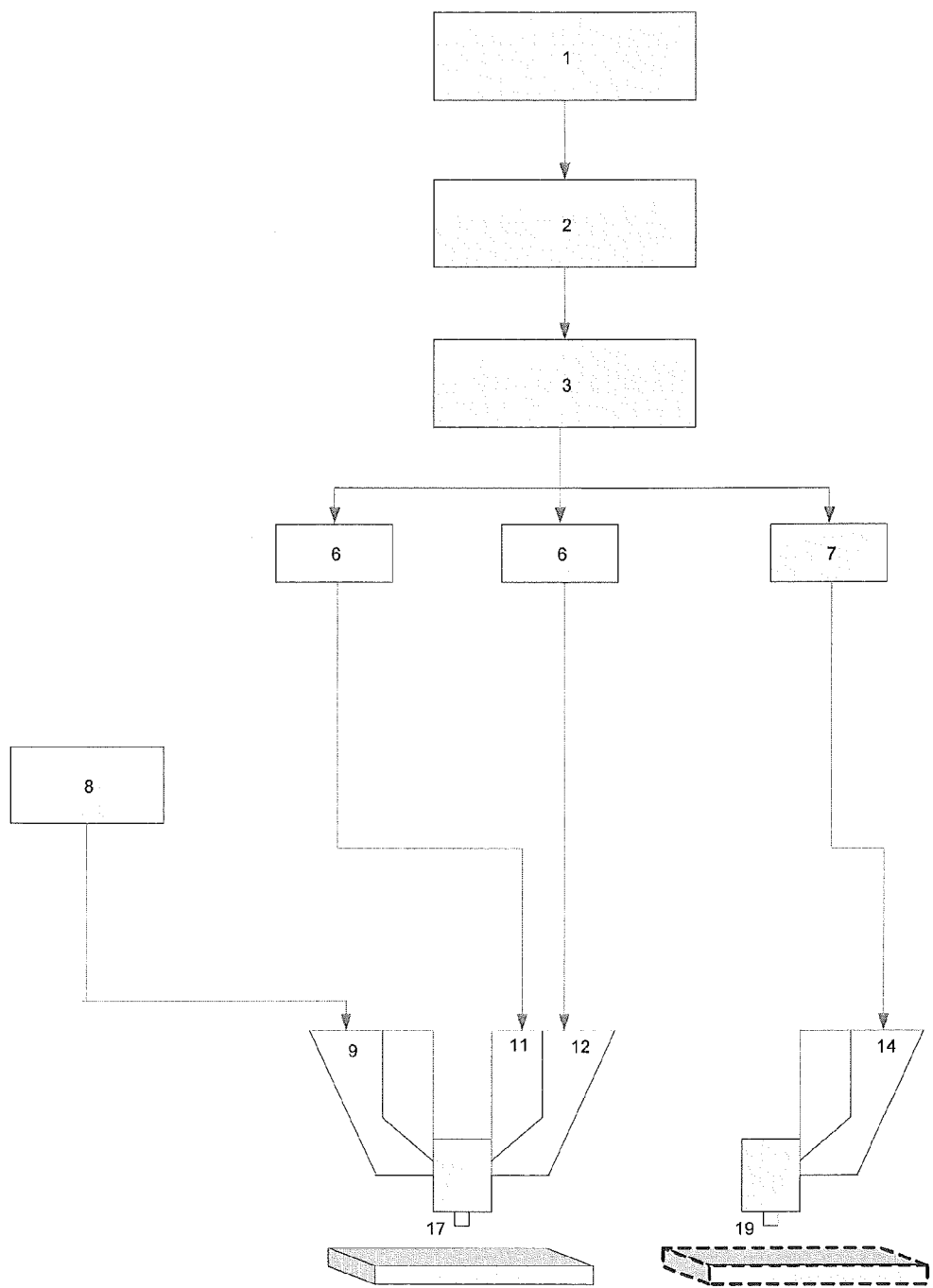
FIG. 4 illustrates schematically the process steps for making a jelly confectionery according to a fourth embodiment of the invention.
Figure 5:
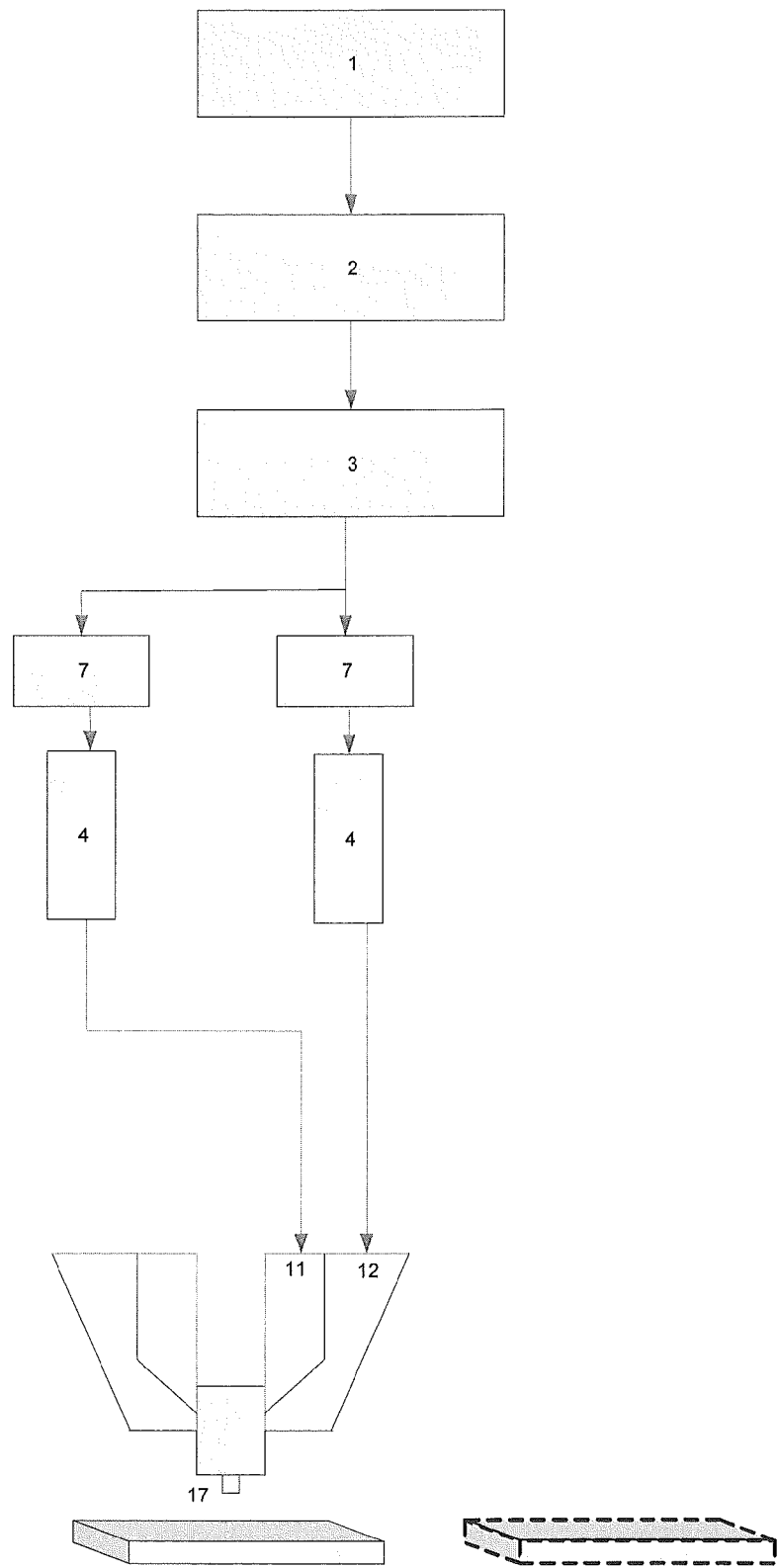
FIG. 5 illustrates schematically the process steps for making a jelly confectionery according to a fifth embodiment of the invention.
Figure 6:
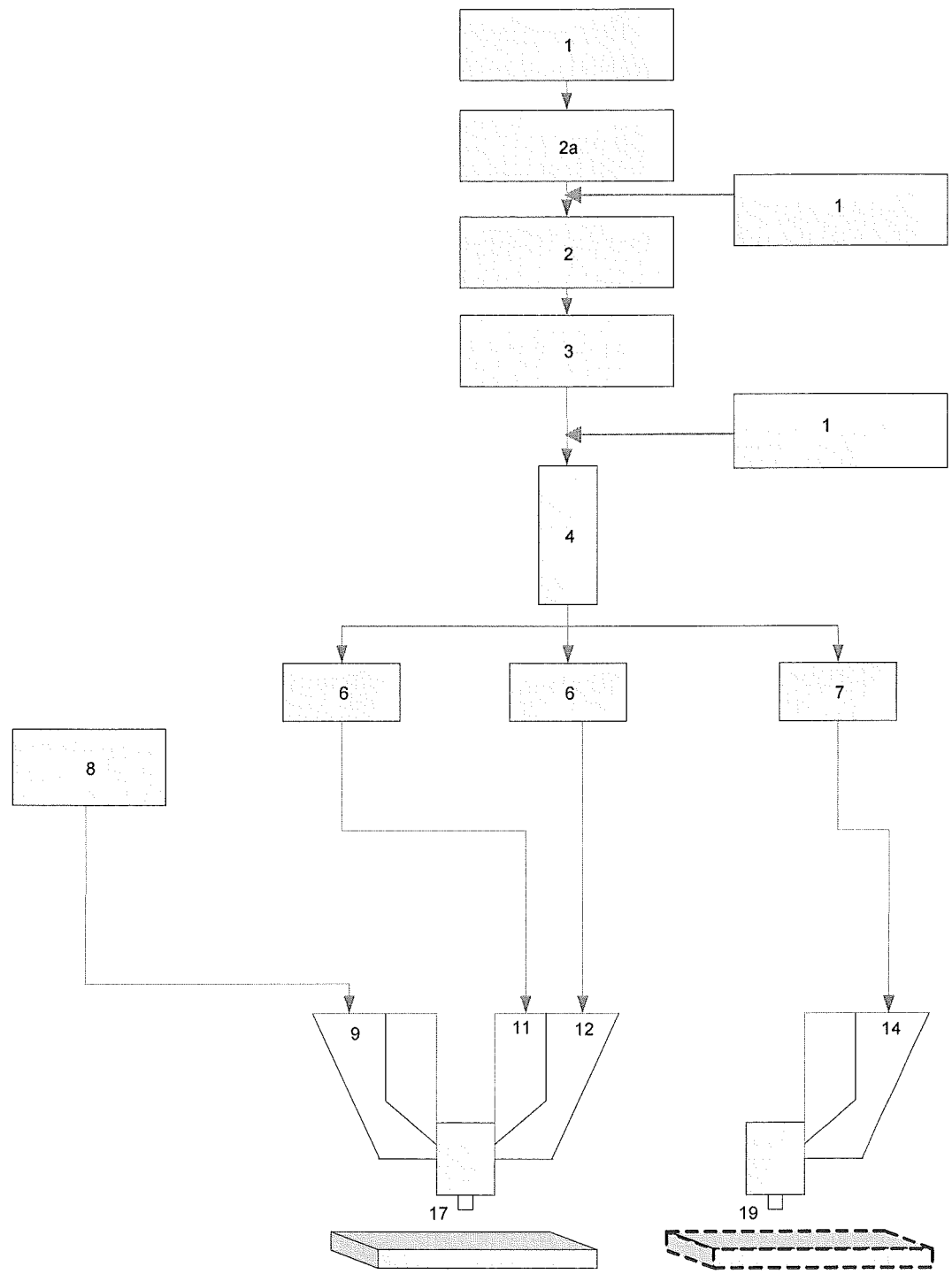
FIG. 6 illustrates schematically the process steps for making a jelly confectionery according to a sixth embodiment of the invention.
Figure 7:
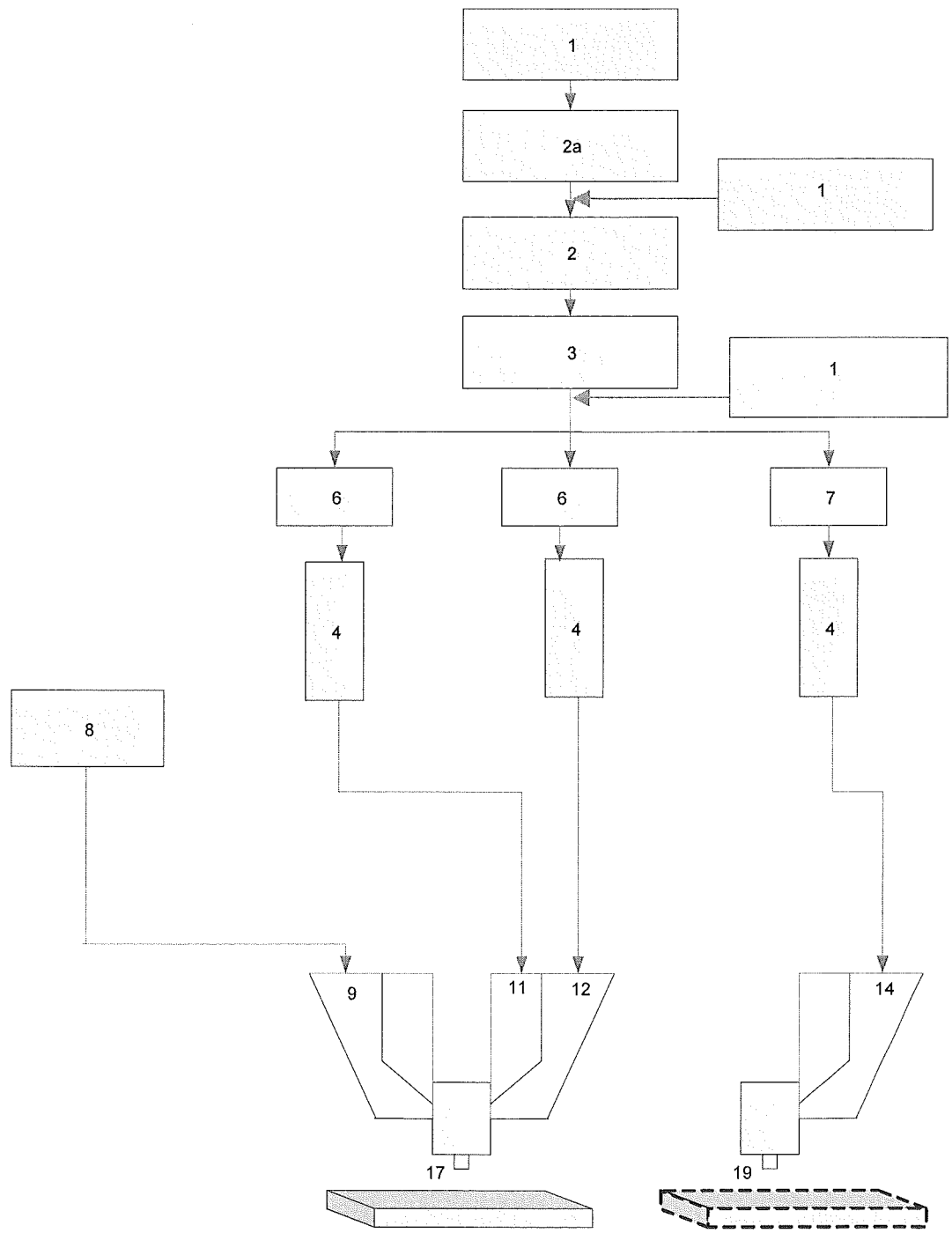
FIG. 7 illustrates schematically the process steps for making a jelly confectionery according to a seventh embodiment of the invention.
Figure 8:
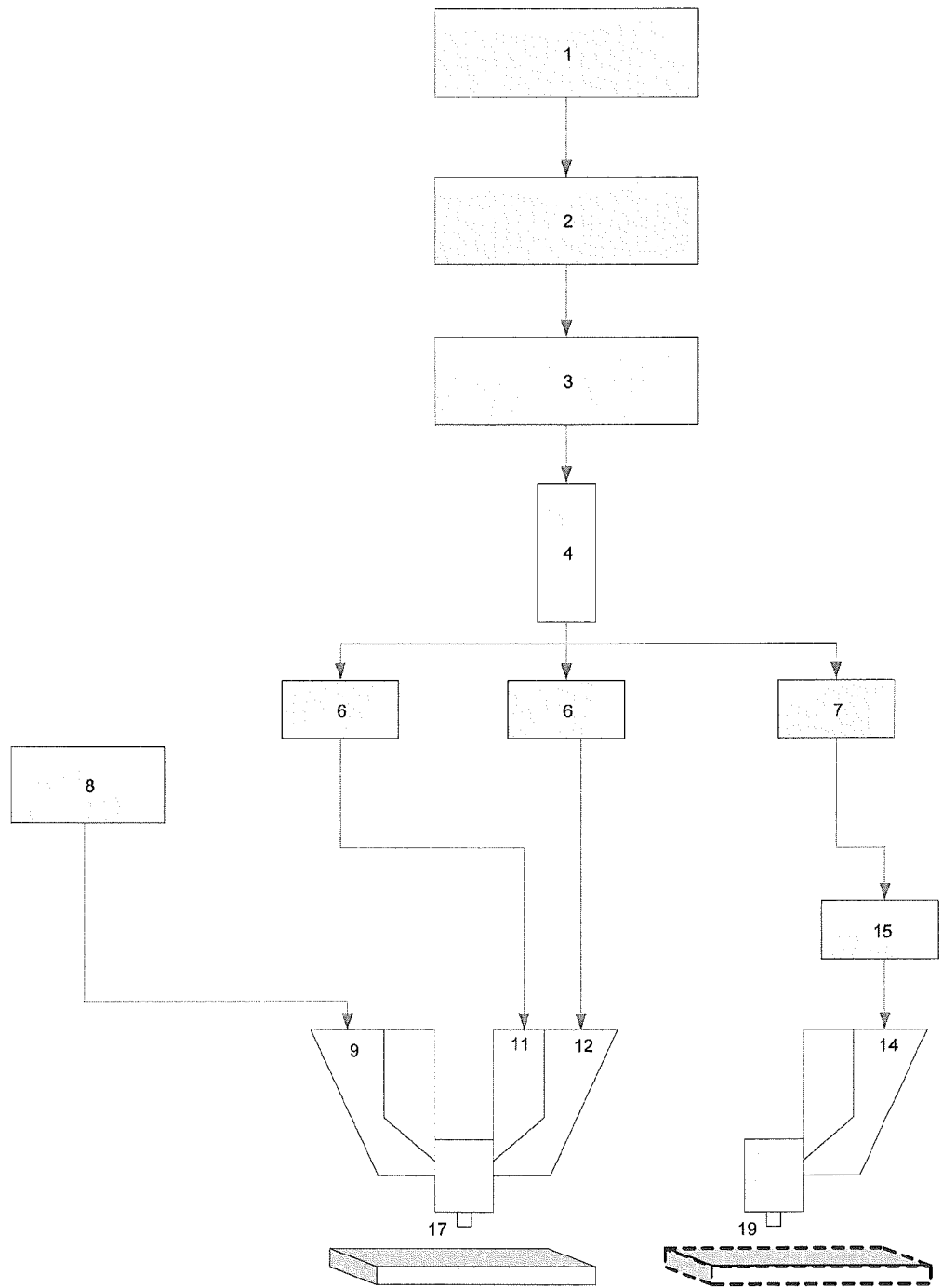
FIG. 8 illustrates schematically the process steps for making a jelly confectionery according to a eighth embodiment of the invention.
Figure 9:
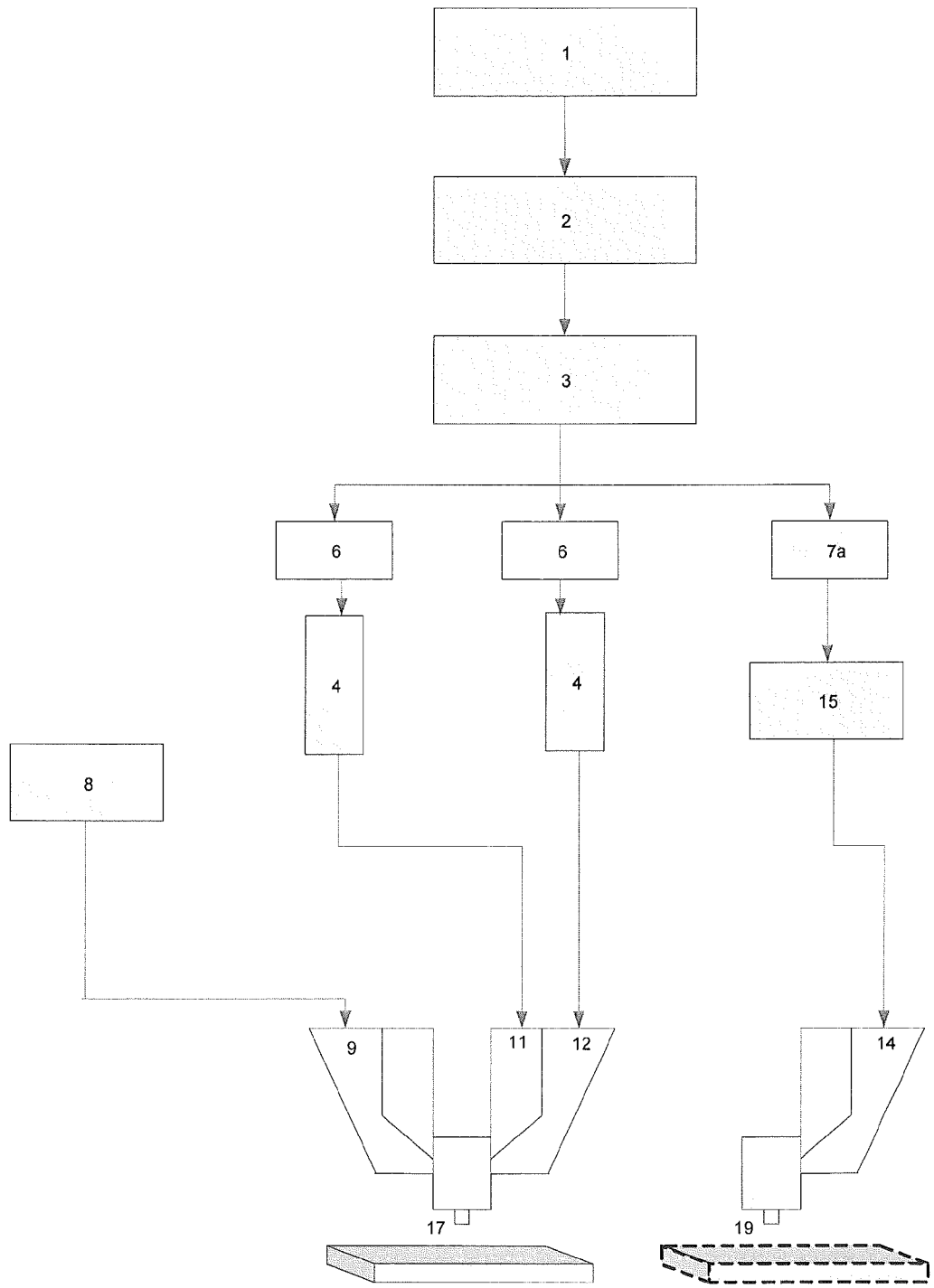
FIG. 9 illustrates schematically the process steps for making a jelly confectionery according to a ninth embodiment of the invention.
Figure 10:
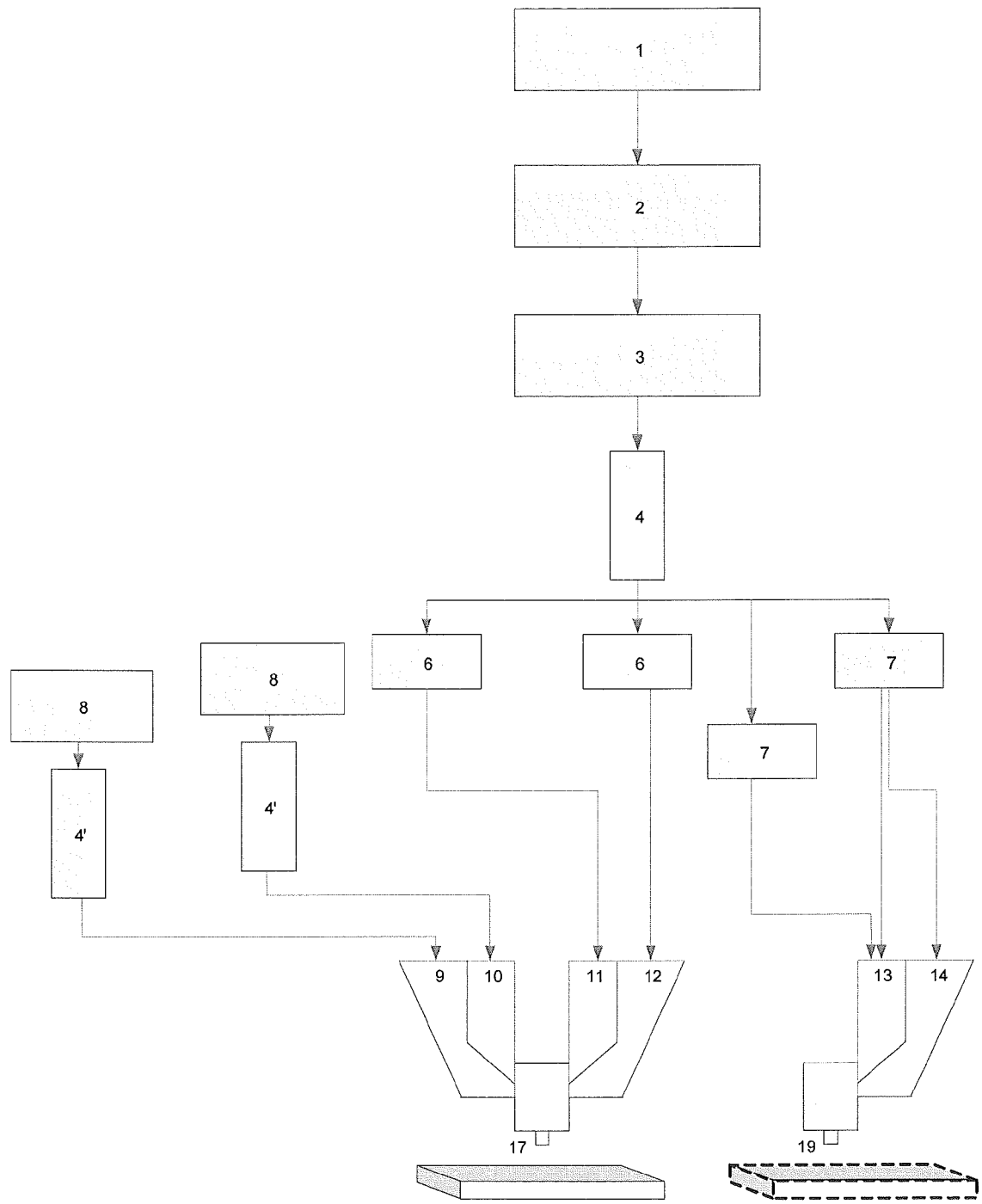
FIG. 10 illustrates schematically the process steps for making a jelly confectionery according to a tenth embodiment of the invention.
Figure 11:
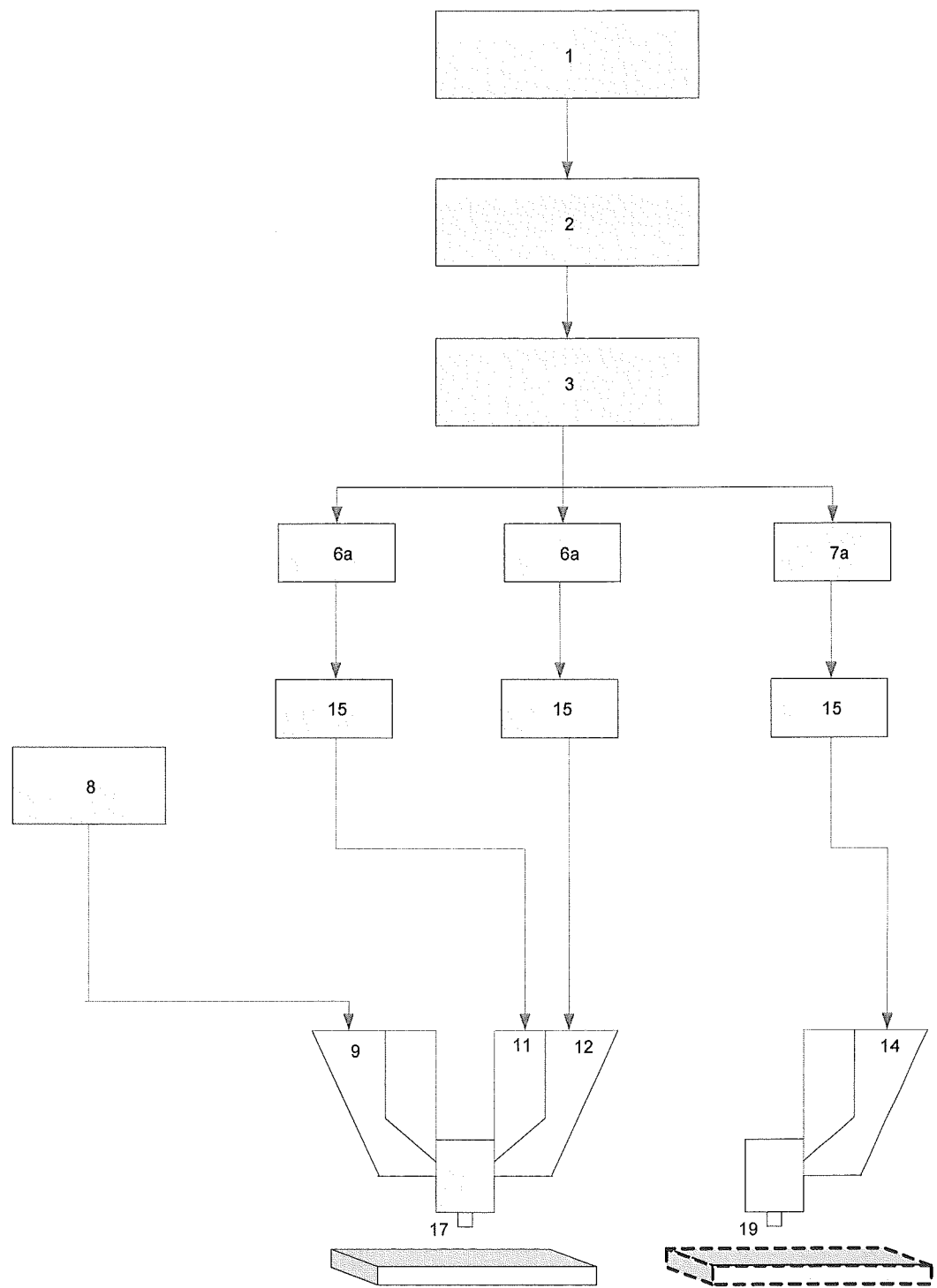
FIG. 11 illustrates schematically the process steps for making a jelly confectionery according to a eleventh embodiment of the invention.
Figure 12:
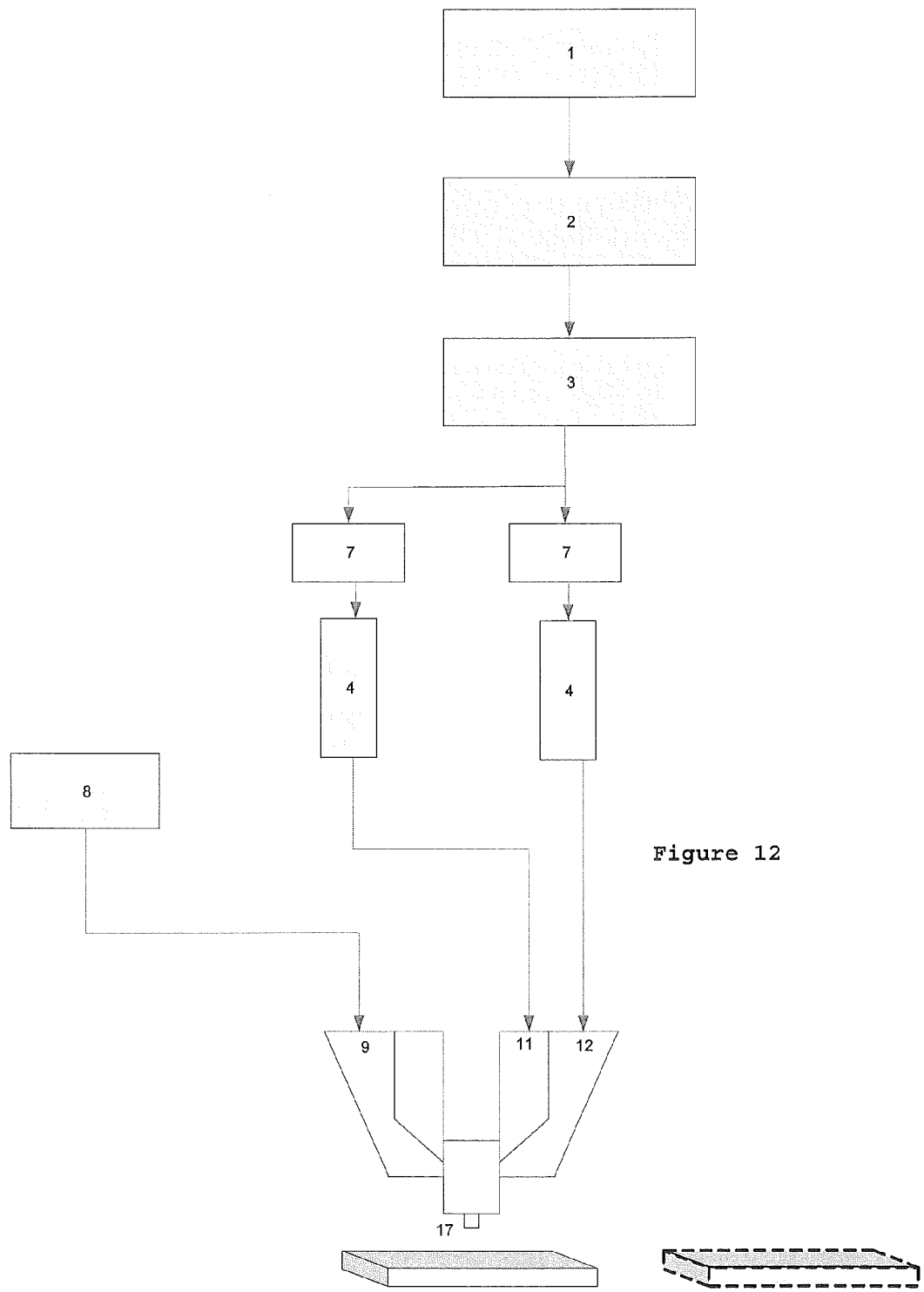
FIG. 12 illustrates schematically the process steps for making a jelly confectionery according to a twelfth embodiment of the invention.
Figure 13:
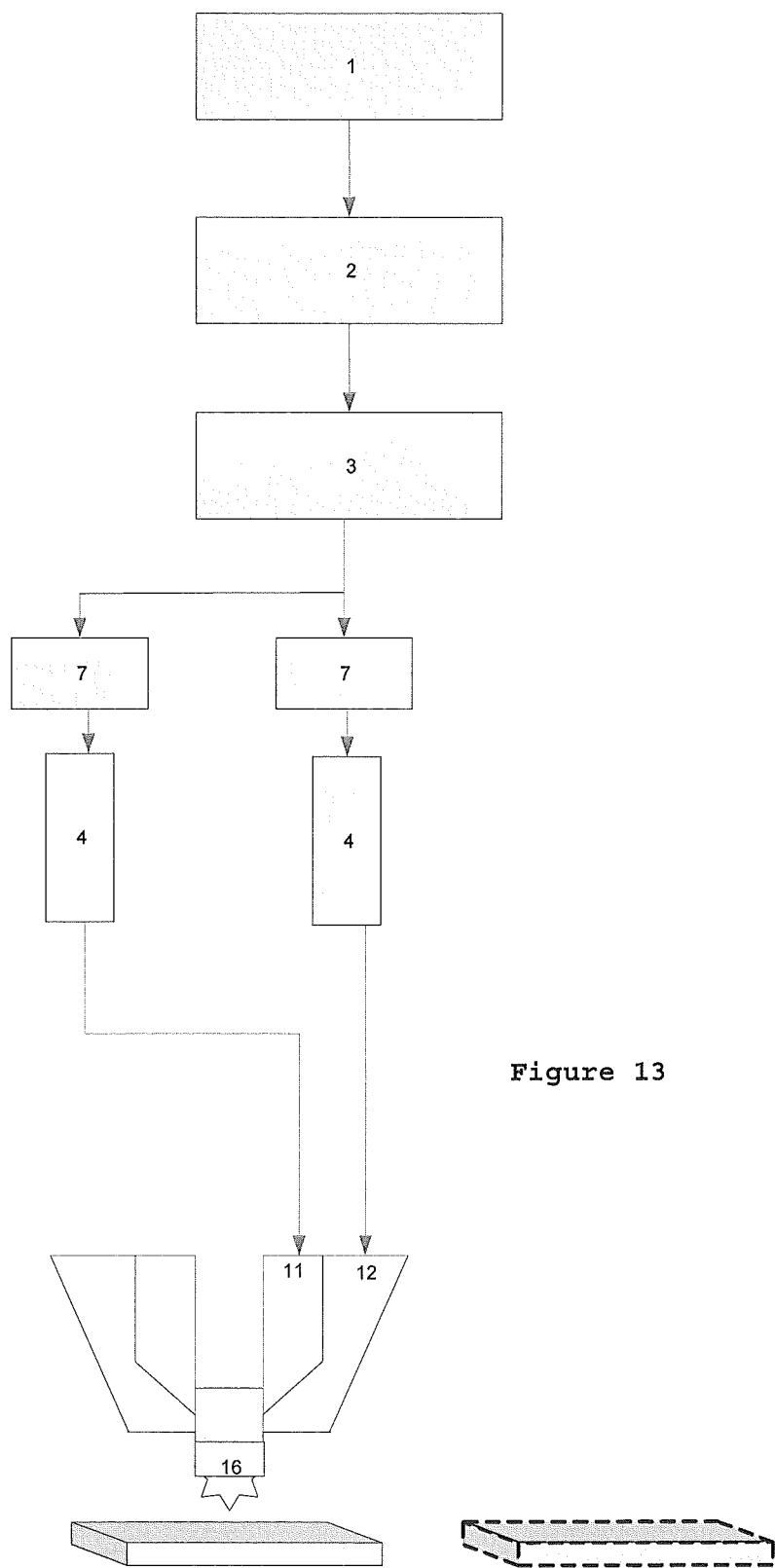
FIG. 13 illustrates schematically the process steps for making a jelly confectionery according to a thirteenth embodiment of the invention.
Figure 14:
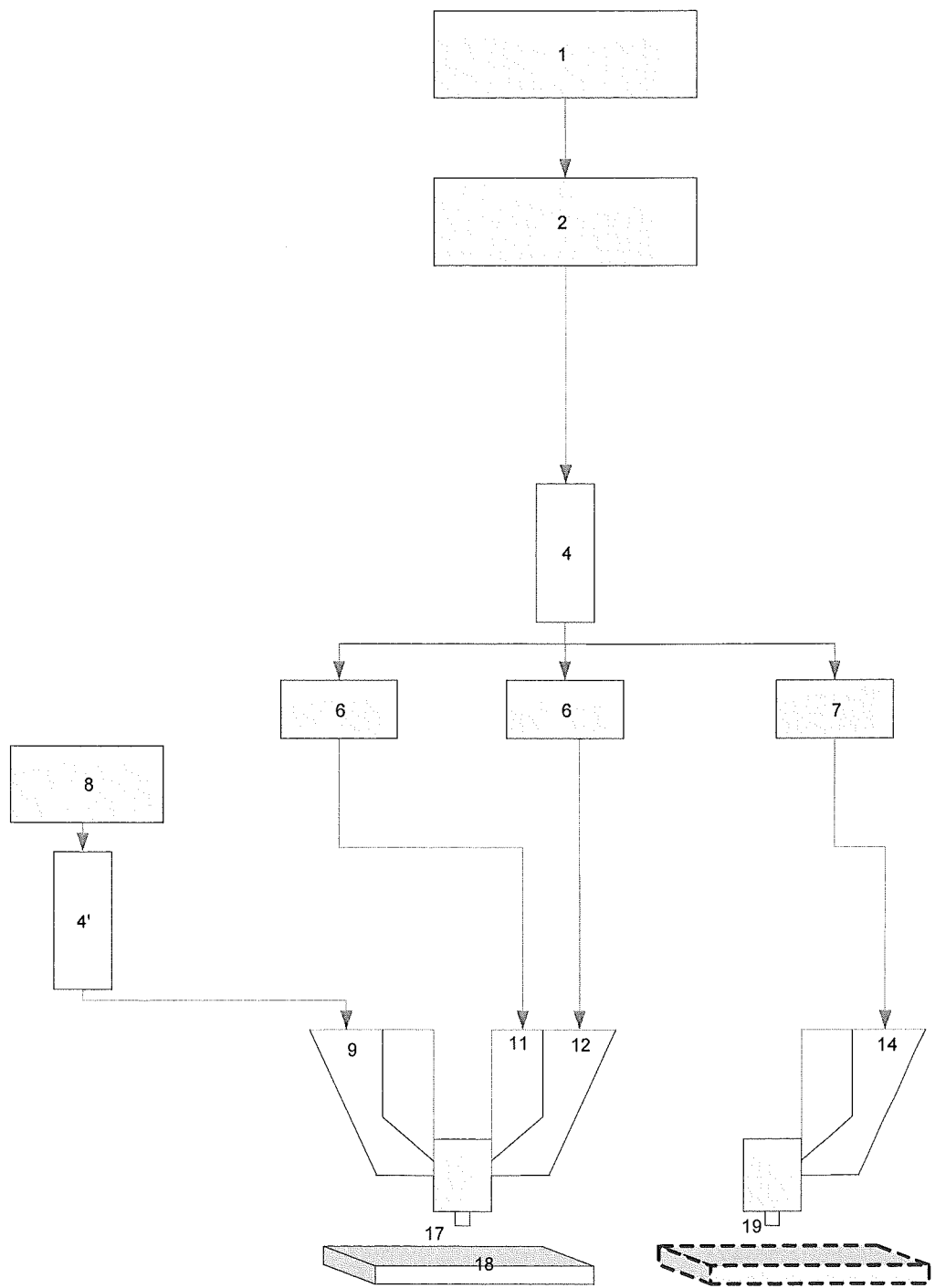
FIG. 14 illustrates schematically the process steps for making a jelly confectionery according to a fourteenth embodiment of the invention.
Figure 15:
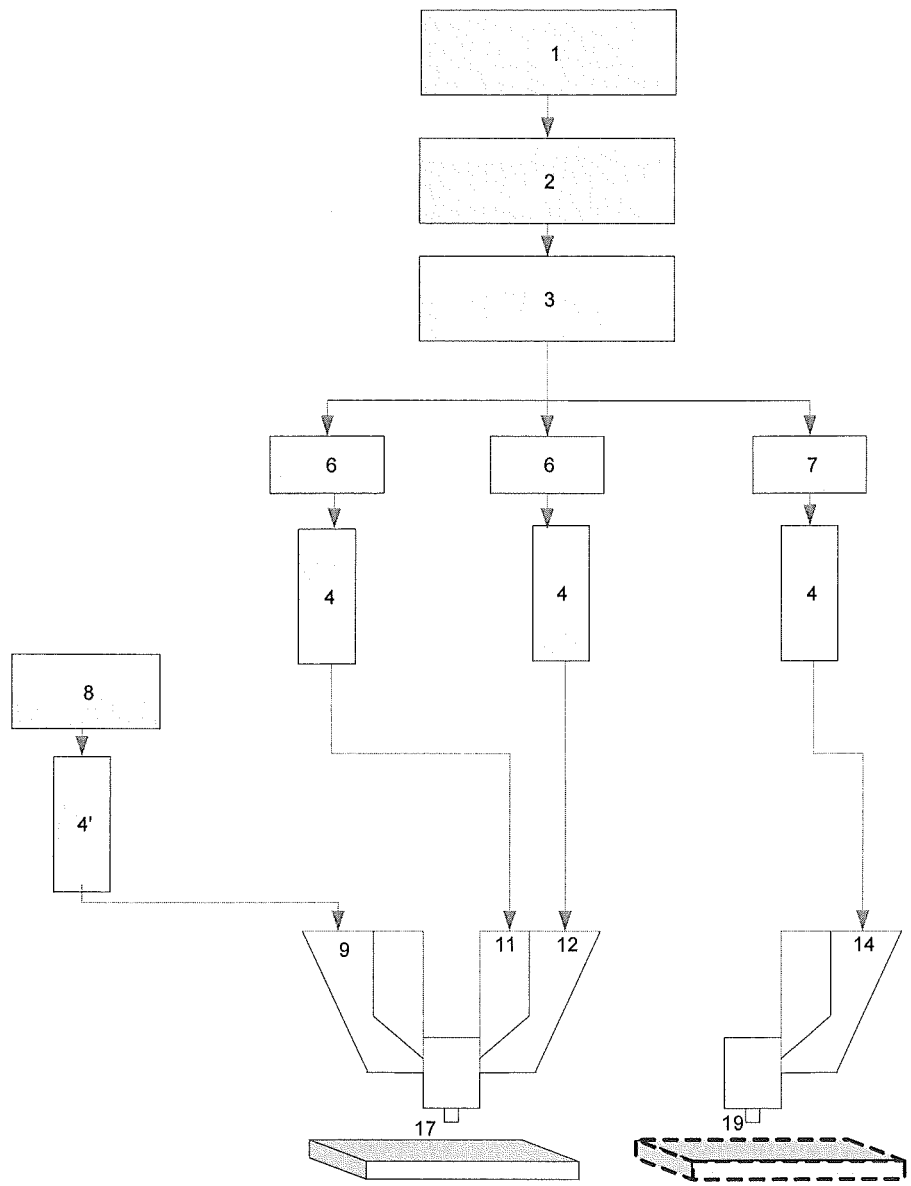
FIG. 15 illustrates schematically the process steps for making a jelly confectionery according to a fifteenth embodiment of the invention.
Figure 16:
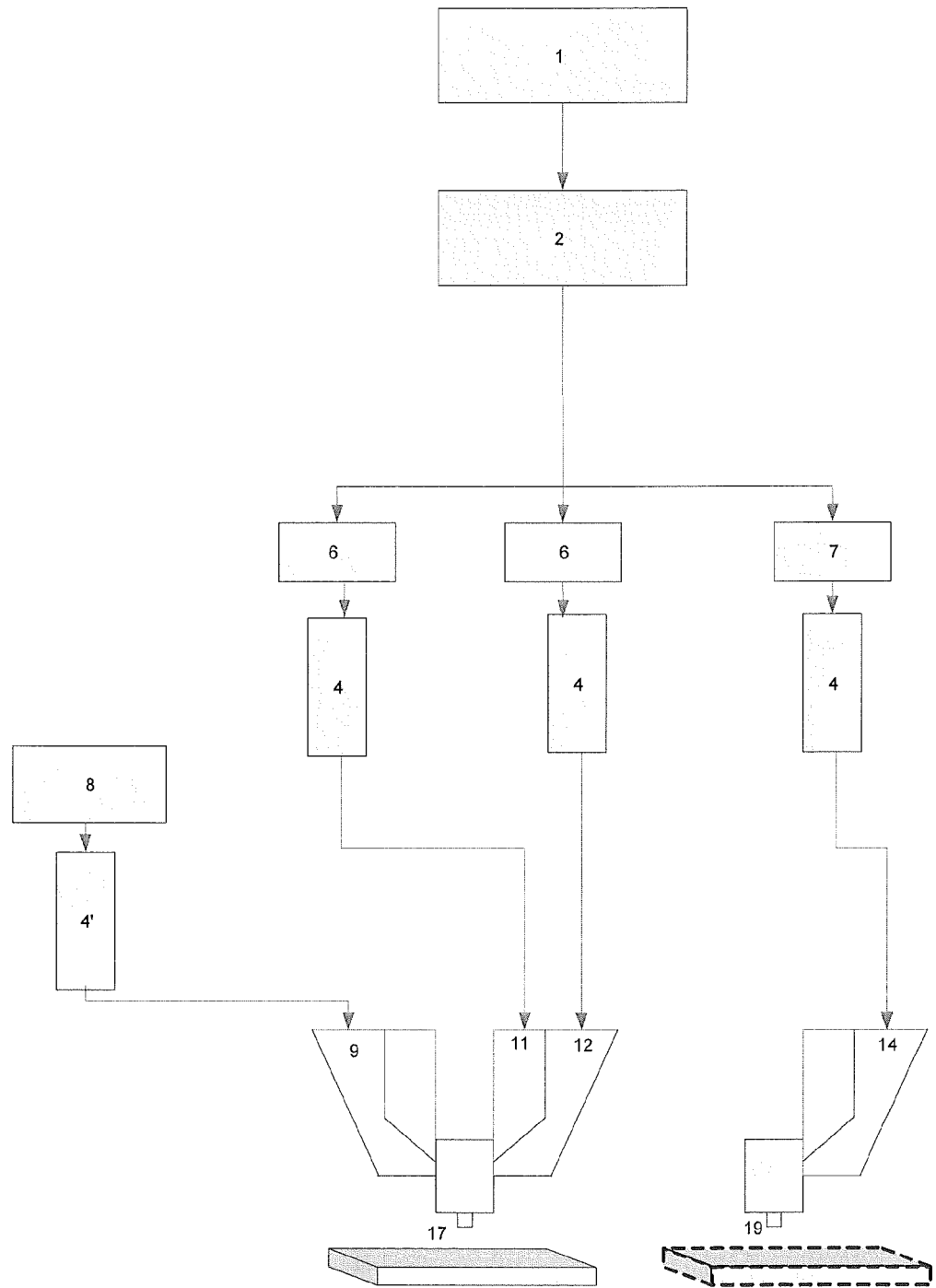
FIG. 16 illustrates schematically the process steps for making a jelly confectionery according to a sixteenth embodiment of the invention.
Figure 17:
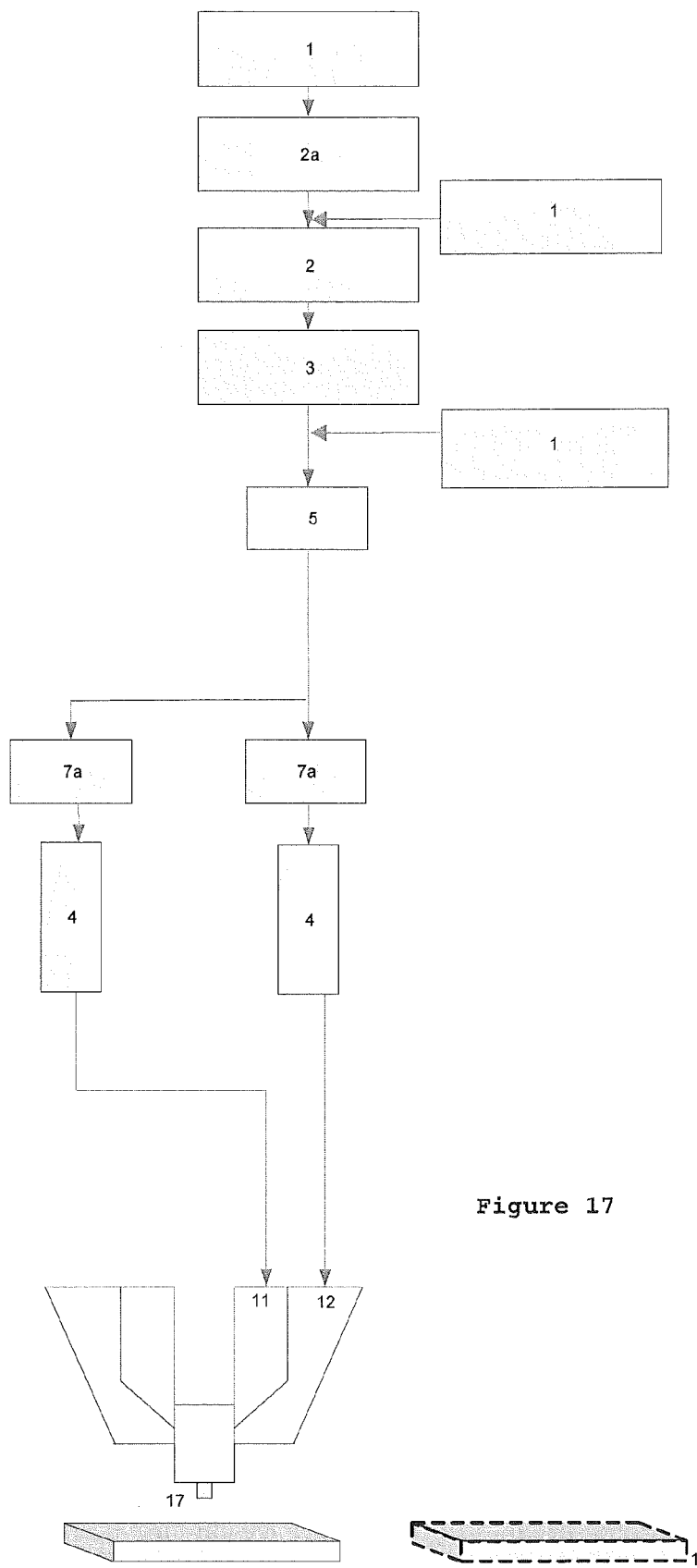
FIG. 17 illustrates schematically the process so steps for making a jelly confectionery according to a seventeenth embodiment of the invention.
Figure 18:
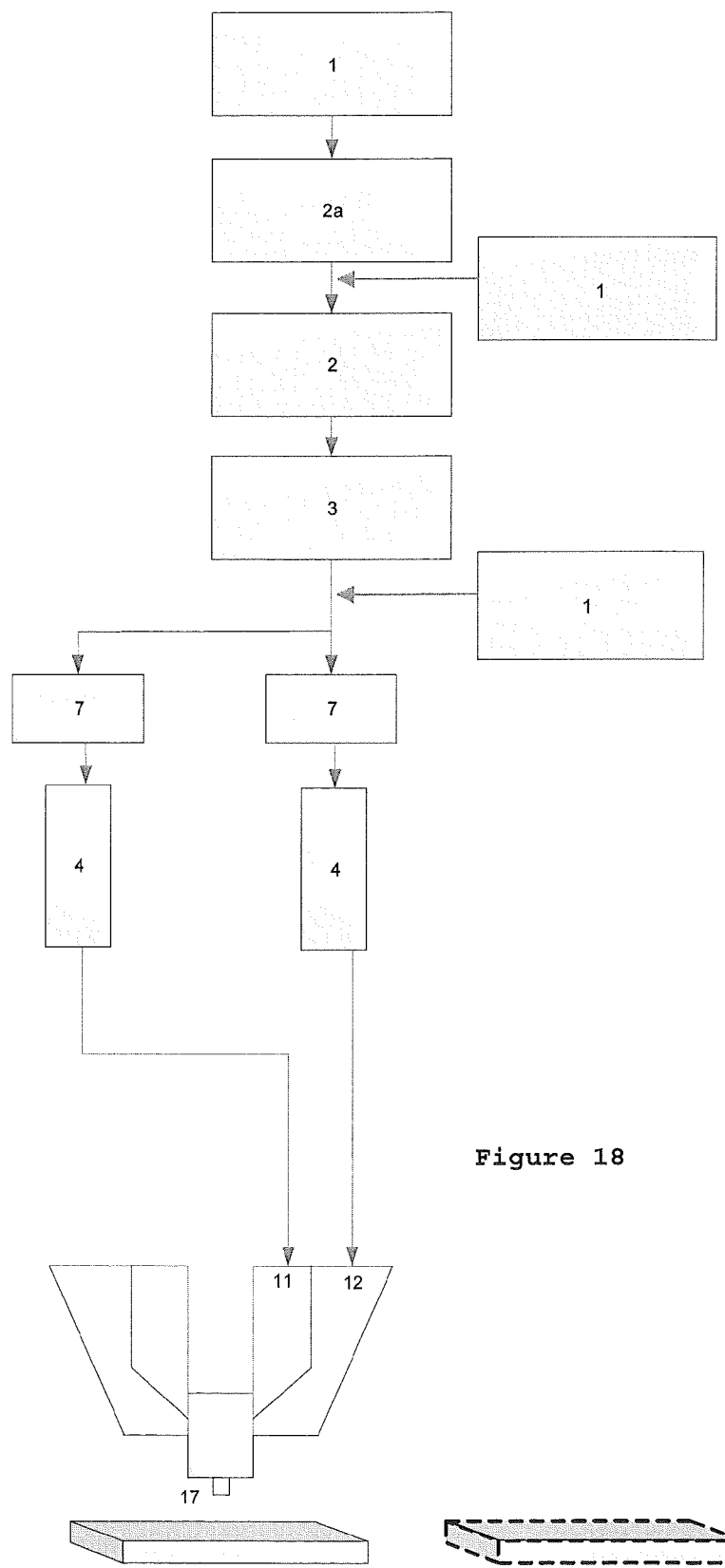
FIG. 18 illustrates schematically the process steps for making a jelly confectionery according to a eighteenth embodiment of the invention.
Figure 19:
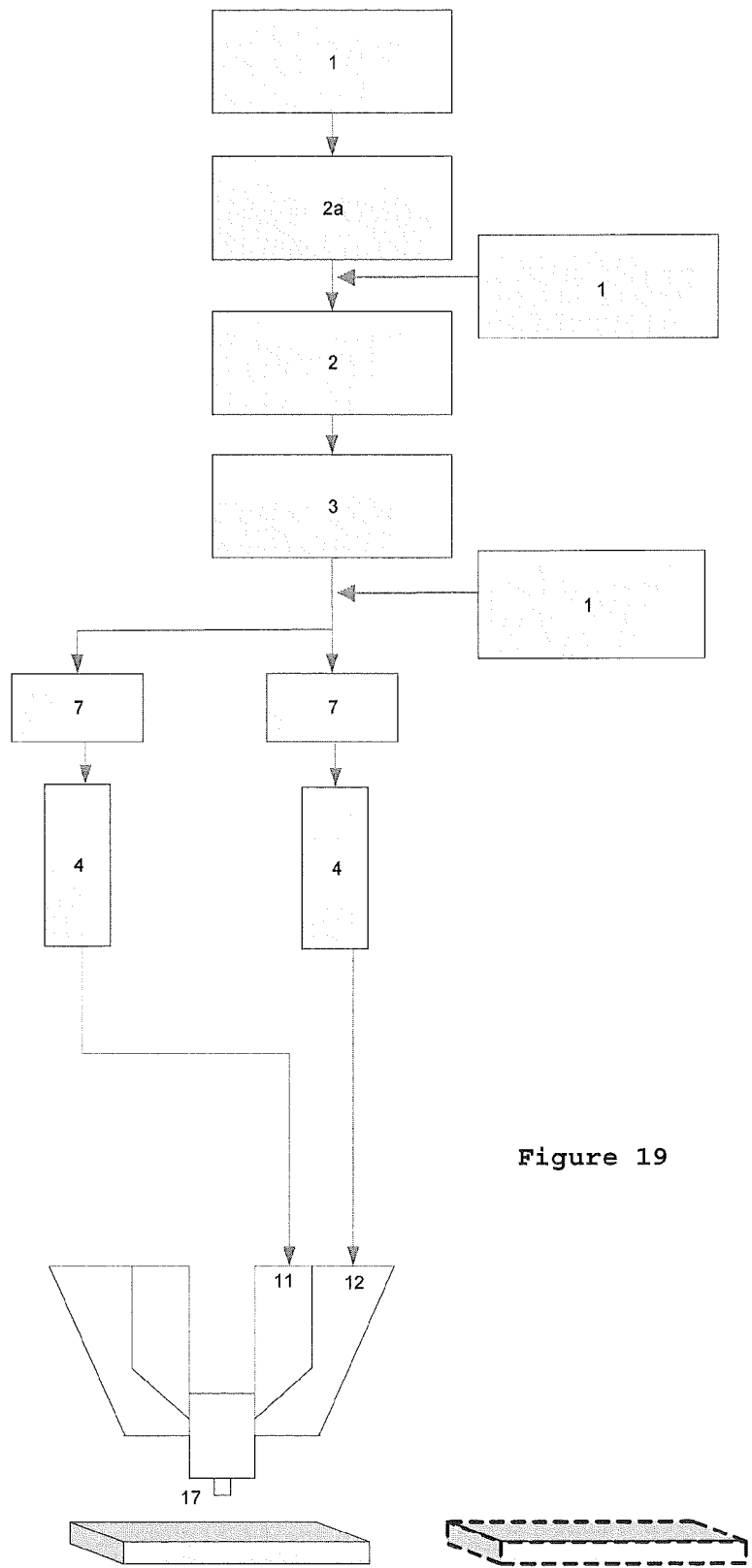
FIG. 19 illustrates schematically the process steps for making a jelly confectionery according to a nineteenth embodiment of the invention.
Figure 20:
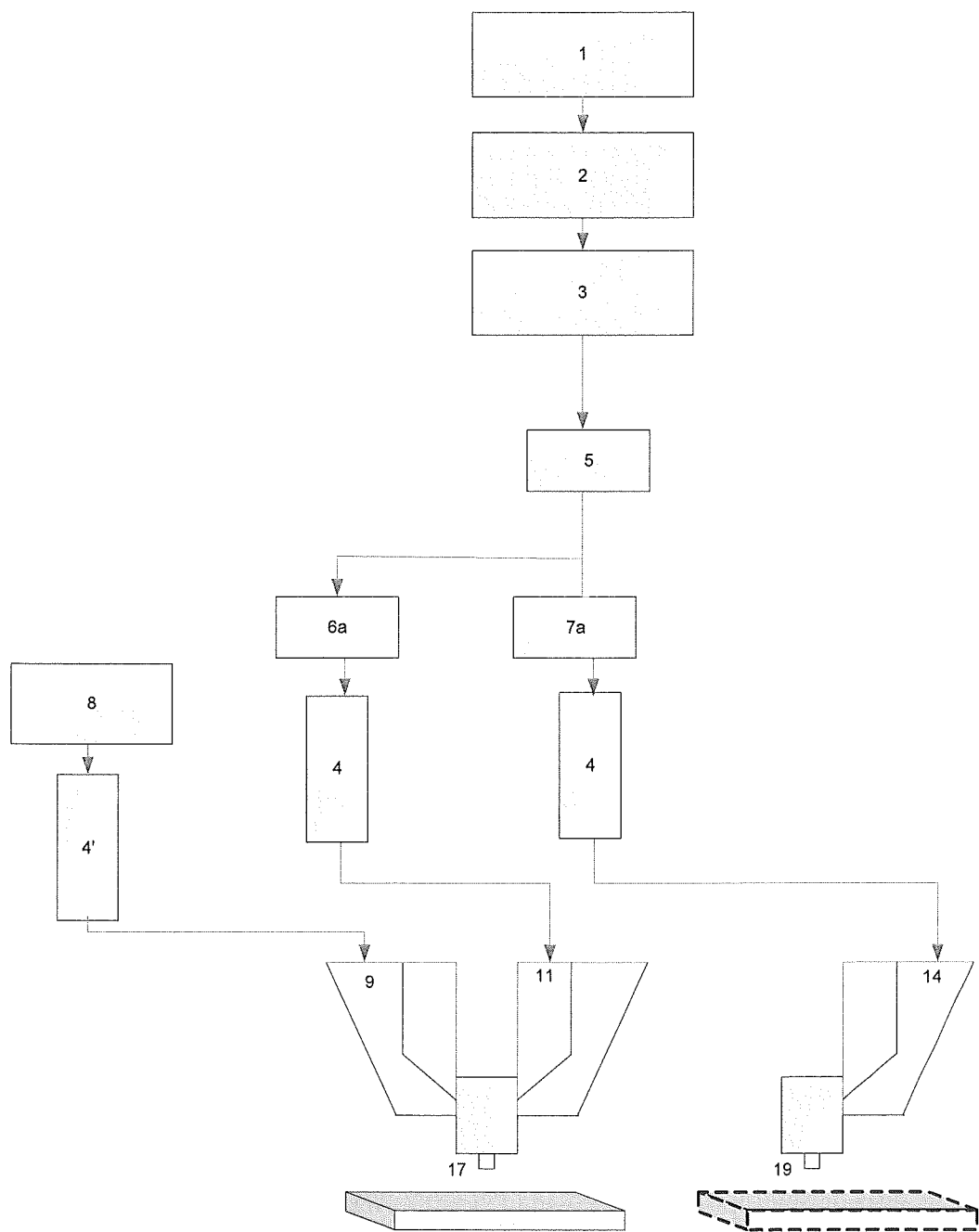
FIG. 20 illustrates schematically the process steps for making a jelly confectionery according to a twentieth embodiment of the invention.

The method of the present invention is beneficial as it enables jelly confectionery pieces to be made in a new way that preserves the desired final jelly texture qualities, whilst minimising or avoiding production problems such as blocking of passageways in the production equipment. The new products of the present invention provide a new and unique visual appearance.

According to one aspect, there is provided a method for making a jelly confectionery which involves a temporary modification of the viscosity of the liquid jelly confectionery composition for a period of time commencing prior to deposition of the liquid jelly confectionery into a mould. This can be achieved by the application of ultrasound frequency vibrational energy to the liquid jelly confectionery composition prior to deposition, or by other suitable techniques.

A temporary modification in viscosity refers to a modification that persists for a limited time period, following which the viscosity returns at least partly to the pre-modified viscosity level. The time period during which the viscosity remains in the modified state will depend on the conditions applied, but could be a time period of at least 15 minutes, such as at least 20 minutes. The maximum time period will also depend on the conditions applied, and the time period desired to achieve the benefits of viscosity reduction, and could be a maximum of 5 hours, 3 hours, 2 hours, 1 hour or otherwise.

Ultrasound frequency vibrational energy refers to the application of mechanical vibrations to the liquid jelly confectionery, where the frequency of the vibrations is in the ultrasound frequency range. The ultrasound frequency range generally covers frequencies of about 20 kHz or more. The frequency range can generally be between 20 kHz and 400 MHz, although the frequency can be within the narrower ranges of between 20 kHz and 100 kHz, or 20-40 kHz.

The core component of a device for applying ultrasound frequency vibrational energy is a sonicator. Sonicators are known devices in the field of ultrasonics which vibrate (mechanically) at a frequency that is in the ultrasound range. Contact of the sonicator with a fluid causes the vibrational energy to pass from the sonicator to the fluid, which causes molecules making up that fluid to vibrate at the same frequency. This molecular vibration of the molecules making up the fluid results in changes to the properties of the fluid, such as changes in the viscosity of the fluid. However, at the same time, there is a need to ensure that the ultrasound frequency vibrational energy does not disturb or destroy the functionality of the molecules making up the fluid. For example, in the case of hydrocolloid gelling agents, if the ultrasound frequency vibrations applied to the hydrocolloid molecules was to damage or change the hydrocolloid gelling agent in such a way that it was no longer capable of gelling, then this would prevent the use of ultrasonics in this application. It has been found by the applicant that rather than damaging or changing the functionality of the hydrocolloid gelling agent, improvements in viscosity are obtained, such as a reduction in the viscosity, that assist in the production of jelly confectionery, and there is no damage or change to the gelling characteristics.

The application of ultrasound frequency vibrational energy may be effected by providing a generator that generates electrical oscillations of ultrasound frequency, a transducer that converts the electrical oscillations into mechanical vibrations, and the sonotrode which is placed in contact with the fluid. The sonotrode is caused to vibrate by the transducer, thus transmitting the vibrational energy to the fluid.

Sonotrode

A range of different types of sonotrodes can be used to apply the ultrasound frequency vibrational energy to the liquid jelly confectionery material, including probe sonotrodes, nozzle plate sonotrodes and sonication chamber-type sonotrodes. In the case of a probe-type sonotrode, this may comprise a probe that is inserted into (immersed in) the flow of jelly confectionery material, which transmits the mechanical vibrations in the ultrasonic frequency range to the jelly confectionery material. This may be in a flow passageway, line, vessel, chamber, tank or any other component of the jelly manufacturing line. In the case of a nozzle plate sonotrode, this can be located at any location where the liquid jelly confectionery material needs to flow through one or a series of openings, or nozzles, such as at the point of deposition, in a depositor. In the case of sonication chamber sonotrodes, an existing chamber or vessel in the jelly confectionery manufacturing line can be constructed as a sonication chamber that vibrates at a frequency in the ultrasound frequency range, or an additional chamber may be inserted into the manufacturing line to provide this function.

The sonotrode may be located in any vessel, line or location in the jelly confectionery manufacturing line, such as in a batching tank, hopper, holding tank or flow passageway, line, or otherwise.

Ultrasound frequency vibrational energy is suitably applied to the liquid jelly confectionery material at a level of between 0.5 and 20 W·s·ml$^{-1}$ (watt·seconds per milliliter). Care needs to be taken to ensure that the amount of energy applied is appropriate for allowing the viscosity of a given quantity of liquid jelly confectionery material to be modified/reduced for the desired period of time. This time period should be long enough for the reduced viscosity liquid jelly confectionery material to pass through the stages of the process where viscosity modification or reduction is advantageous, but short enough so that it can "relax" and returns at least partly or completely to the pre-modified viscosity levels to allow the cooling and conditioning of the deposited product take place without any adverse impact.

Suitably conditions for the application of ultrasound frequency vibrational energy are a power rating of between 0.1 and 20 kW, such as between 0.5 and 10 kW, and an amplitude of between 50-100%.

The viscosity of the jelly confectionery material can be reduced by at least 10%, such as between 10% and 30%, and up to 50%, on the application of the ultrasound frequency vibrational energy.

Location

The ultrasonic frequency vibrational energy may be applied at any suitable location, and may be applied at more than one location. It may be applied prior to or following cooking of the jelly confectionery composition, but is preferably applied following cooking and before the point of deposition.

Typically, acid, and optionally colour and/or flavour, are added to the cooked liquid jelly confectionery composition prior to deposition. According to one embodiment the ultrasonic frequency vibrational energy is applied after addition of acid, colour and/or flavour. In this situation, the ultrasonic frequency vibrational energy aids mixing of the added ingredients with the cooked liquid jelly confectionery composition. The viscosity improvements also continue to remain for a sufficient time following application of the ultrasonic energy at this point until deposition.

According to one embodiment, the jelly confectionery is a centre-filled jelly confectionery. The ultrasonic frequency vibrational energy can be applied to the liquid jelly confectionery composition forming the outer shell of the centre-filled jelly confectionery, and it can be applied to the centre filling composition prior to deposition. Application of ultrasonic frequency vibrational energy can be applied to the centre filling using any of the types of devices described in the context of the liquid jelly confectionery composition, and can be set at the same or different frequency and/or amplitude. Production of a centre-filled product can be performed with a one-shot depositor. However, other techniques for producing a centre-filled product can be used.

Viscosity Improvements

The application of ultrasonic energy reduces the viscosity of the liquid jelly confectionery composition, and allows for higher solids depositing based on a temporary viscosity reduction. This allows a reduction in time taken for cooling and conditioning of the deposited product. When applied to the centre filling of a centre-filled product, it also assists in providing a temporary reduction in viscosity of the filling, which also assists with deposition of the filling.

The use of ultrasonics allows the jelly confectionery composition to contain a higher solids content than is otherwise possible, while still avoiding or minimising tailing. The solids content level is broadly above 71%, and may be in the range of about 71%-82%, such as 73%-78% solids, or 78%-82% solids. Depositing at above 73% solids is an option for starch/gelatine jellies. Previously, jellies with a total solids % of greater than 71% have been very difficult to deposit, and therefore 70% solids or less is typically used (depending on the gelling agent).

Drying/Stoving

The ability to effectively deposit higher solids jellies provides a significant economic benefit to manufacturers as stoving cycles can be substantially reduced, or even eliminated.

Stoving refers to the stage of drying (otherwise referred to as cooling and conditioning) during which the liquid jelly confectionery composition solidifies. This typically takes place in a drying room with controlled temperature and humidity conditions.

Reduction in stoving cycle time of at least 30% has been achieved with the use of the viscosity modification techniques, compared to the stoving cycle time for a confectionery made by the same process and from the same composition but without viscosity reduction during depositing. The stoving can be completely eliminated when the solids content of the jelly composition is sufficiently high (such as above 80%), or can be reduced by as much as 55% if a more conventional solids content of the jelly composition is used (around 70% to 80%, such as 70%-77%). A stoving cycle time refers to the time taken for jelly confectionery deposited into moulds to dry in the drying room. A shorter cycle reduces the energy input required to achieve drying, and then frees up the drying room for further product to be dried. This reduction in product stoving cycle time can result in greater throughput and therefore reduce the need for new drying rooms to be installed to achieve a greater throughput. There is also an energy saving from depositing at higher solids due to the reduced amount of moisture that needs to be removed to reach final product solids.

Jelly Compositions

The term "jelly confectionery" is used broadly to refer to those confectioneries known as jellies, gummys, jubes, pastilles, gelatines and similar. Jelly confectionery is made with bulk sweetener which may be a sugar-based sweetener, a sugarless sweetener or a mixture thereof, and a hydrocolloid gelling agent. The hydrocolloid gelling agent imparts setting properties on the confectionery.

Sugar-based bulk sweeteners generally include saccharides. Suitable sugar sweeteners include mono-saccharides, di-saccharides and poly-saccharides such as but not limited to, sucrose (sugar), dextrose, maltose, dextrin, xylose, ribose, glucose, mannose, galactose, fructose (levulose), lactose, invert sugar, fructo oligo saccharide syrups, partially hydrolyzed starch, corn syrup solids, such as high fructose corn syrup, and mixtures thereof.

According to one embodiment a combination of sugar and glucose is used. The relative amounts by weight of sugar and glucose may be between 20:80 and 80:20.

Suitable sugarless bulk sweetening agents include sugar alcohols (or polyols) such as, but not limited to, sorbitol, xylitol, mannitol, galactitol, maltitol, hydrogenated isomaltulose (isomalt), lactitol, erythritol, hydrogenated starch hydrolysate and mixtures thereof.

The amount of bulk sweetener in the jelly confectionery composition at the stage of cooking is about 45% to 85% by weight.

Suitable hydrocolloid gelling agents include pectin, agar-agar, gelatin, starch, xanthan gum, locust bean gum, carageenan, gum arabic and combinations thereof. The hydrocolloid may comprise a combination of gelling agents, such as a combination of gelatin and starch.

The amount of gelling agent is suitably between 3% and 18% of the jelly confectionery composition at deposition, such as between 5% and 16%.

Some hydrocolloids such as starch and gelatin will be pre-mixed with water prior to being combined with the bulk sweetener.

The bulk sweetener and hydrocolloid is combined with water in a batching tank which measures in the required quantities of ingredients.

The liquid jelly confectionery composition may further comprise other ingredients such as acid, flavour, colour, high intensity sweetener, flavour modulators, flavour potentiators, coolants, warming agents, fruit juice concentrate, mouth moisteners, humectants, oral care agents, medicaments, botanicals, health-promotion agents and so forth. Those ingredients that are not heat stable should be added to the liquid jelly confectionery composition after cooking. Thus, acid, flavours and colours are commonly added after cooking. The ingredients that are stable to the cooking temperatures may be added to the jelly confectionery composition in the batching tank, or they may be pre-mixed with the bulk sweetener or the hydrocolloid.

Colours suitable for use in jelly confectionery compositions include any of the commercially available food grade colours, pigments or visual effect agents known in the art. Suitable colours are available from CHR Hansen, Tate & Lyle, Merck, G.N.T, Sensient Technologies, Quest or Givaudan. Colours may be natural and artificial, water soluble and oil soluble. Colour is used broadly to refer to ingredients that provide a colour effect, or any other applied visual effect such as shine, shimmer or sparkle. "Colour pigment" is used to refer to the specific use of a colour agent that provides colour only and not another visual effect. Some agents provide a visual effect other than just colour. Examples of pigments that provide shine, shimmer, sparkle, luminescence, or a pearl-effect are those pigments available under the trade marks Candurin, Colorona, Timiron, Dichrona, Biron, Xirona, Iriodin, Colourstream and Xirallic ranges from Merck. Candurin and Colorona are notable examples. Another agent that can be used to give a visual effect different to that provided by a standard colour pigment is microencapsulated flavour beads. Such beads appear to be coloured particles and can be distributed in the liquid jelly confectionery composition (for a casing and/or the backing layer, in the case of a centre-filled composition) to provide a speckled colour effect, in addition to the flavour effect that they provide.

The colour can be selected to be appropriate for a given flavour, but colours that do not reflect the flavour may also be used. The amount of colour should be appropriate to achieve the desired depth of colour. Suitable colours include yellow, orange, red, green, purple, peach, pink, black, violet, brown, silver, blue, gold, bronze, copper, pink and combinations thereof. Silver, gold and other metallic effect colours can be provided in the form of satin, silk or brilliant shines, and glitter effects.

Flavours suitable for use in jelly compositions include any of the commercially available food grade flavours known in the art, available from suppliers to the food industry such as Sensient Technologies, Firmenich, Givaudan, Essential Flavours and Ingredients, Selesia/Orica, Kerry Ingredients, International Flavours and Fragrances and Quest International. Suitable flavours include natural, artificial and nature-identical flavours, water soluble and oil soluble flavours. The choice of flavour is generally based on the desired flavour for the product, and the amount is generally based on the strength of the flavour itself (natural flavours tend to be less strong per unit volume or weight), and the desired strength of flavour in the product. Suitable flavours include fruit flavours, floral and herbal flavours, tea-based flavours, mints, chocolate, vanilla, aniseed and so forth. Suitable flavours include apricot, aniseed, apple, banana, blackcurrant, chrysanthemum, elderflower, feijoa, guava, grapefruit, green tea, honeydew, kiwi, lavender, lemon, lemon balm, lime, lychee, mandarin, orange, passionfruit, peach, pear, pineapple, raspberry, strawberry, vanilla, watermelon, white tea and so forth.

Suitable high-intesity sweeteners include, but are not limited to:

(a) water-soluble sweetening agents such as dihydrochalcones, monellin, steviosides and stevia derived compounds such as but not limited to rebaudiocide A, iso-mogroside V and the like, lo han quo and lo han quo derived compounds, glycyrrhizin, dihydroflavenol, and sugar alcohols such as sorbitol, mannitol, maltitol, xylitol, erythritol, and L-aminodicarboxylic acid aminoalkenoic acid ester amides, such as those disclosed in U.S. Pat. No. 4,619,834, which disclosure is incorporated herein by reference, and mixtures thereof;

(b) water-soluble artificial sweeteners such as soluble saccharin salts, i.e., sodium or calcium saccharin salts, cyclamate salts, the sodium, ammonium or calcium salt of 3,4-dihydro-6-methyl-1,2,3-oxathiazine-4-one-2,2-dioxide, the potassium salt of 3,4-dihydro-6-methyl-1,2,3-oxathiazine-4-one-2,2-dioxide (Acesulfame-K), the free acid form of saccharin, and mixtures thereof;

(c) dipeptide based sweeteners, such as L-aspartic acid derived sweeteners, such as L-aspartyl-L-phenylalanine methyl ester (Aspartame), N—[N-(3,3-dimethylbutyl)-L-α-aspartyl]-L-phenylalanine 1-methyl ester (Neotame), and materials described in U.S. Pat. No. 3,492,131, L-alphaaspartyl-N-(2,2,4,4-tetramethyl-3-thietanyl)-D-alaninamide hydrate (Alitame), methyl esters of L-aspartyl-L-phenylglycerine and L-aspartyl-L-2,5-dihydrophenyl-glycine, L-aspartyl-2,5-dihydro-L-phenylalanine; L-aspartyl-L-(1-cyclohexen)-alanine, and mixtures thereof;

(d) water-soluble sweeteners derived from naturally occurring water-soluble sweeteners, such as chlorinated derivatives of ordinary sugar (sucrose), e.g. chlorodeoxysugar derivatives such as derivatives of chlorodeoxysucrose or chlorodeoxygalactosucrose, known, for example, under the product designation of Sucralose or Splenda™; examples of chlorodeoxysucrose and chlorodeoxygalactosucrose derivatives include but are not limited to: 1-chloro-1'-deoxysucrose; 4-chloro-4-deoxy-alpha-D-galactopyranosyl-alpha-D-fructofuranoside, or 4-chloro-4-deoxygalactosucrose; 4-chloro-4-deoxy-alpha-D-galactopyranosyl-1-chloro-1-deoxy-beta-D-fructo-furanoside, or 4,1'-dichloro-4,1'-dideoxygalactosucrose; 1',6'-dichlorol',6'-dideoxysucrose; 4-chloro-4-deoxy-alpha-D-galactopyranosyl-1,6-dichloro-1,6-dideoxy-beta-D-fructofuranoside, or 4,1',6'-trichloro-4, 1',6'-trideoxygalactosucrose; 4,6-dichloro-4,6-dideoxy-alpha-D-galactopyranosyl-6-chloro-6-deoxy-beta-D-fructofuranoside, or 4,6,6'-trichloro-4,6,6'-trideoxygalactosucrose; 6,1',6'-trichloro-6,1',6'-trideoxysucrose; 4,6-dichloro-4,6-dideoxy-alpha-D-galactopyranosyl-1,6-dichloro-1,6-dideoxy-beta-D-fructofuranoside, or 4,6,1',6'-tetrachloro4,6,1',6'-tetradeoxygalacto-sucrose; and 4,6,1',6'-tetradeoxy-sucrose, and mixtures thereof;

(e) protein based sweeteners such as miraculin, extracts and derivatives of extracts of Synseplum dulcificum, mabinlin, curculin, monellin, brazzein, pentadin, extracts and derivatives of extracts of Pentadiplandra brazzeana, thaumatin, thaumaoccous danielli (Thaumatin I and II) and talin;

(f) the sweetener monatin (2-hydroxy-2-(indol-3-ylmethyl)-4-aminoglutaric acid) and its derivatives or isomers; and (g) the sweetener Lo han guo (sometimes also referred to as "Lo han kuo").

The intense sweetening agents may be used in many distinct physical forms well-known in the art to provide an initial burst of sweetness and/or a prolonged sensation of sweetness. Without being limited thereto, such physical forms include free forms, spray dried forms, powdered forms, beaded forms, encapsulated forms, and mixtures thereof. In one embodiment, the sweetener is a high intensity sweetener such as aspartame, sucralose, and acesulfame potassium (e.g. Ace-K or acesulfame-K).

In some confectionery compositions it is desirable to include one or more ingredients having a health-related function, such as oral care agents, medicaments, botanicals and other health-promotion agents. Examples include green tea extract, calcium-containing compounds for oral care, analgesics, antibacterial agents, cough suppressants and herb or botanical extracts (such as green tea extract). These ingredients may be in the liquid jelly confectionery composition forming the casing. Where the confectionery is a centre-filled confectionery, these ingredients may be in one, two or all of the casing, the centre filling and the backing layer.

Process of Making Jelly and Depositing

Depending on the identity of the hydrocolloid, the bulk sweetener, hydrocolloid and optionally other ingredients may be combined with water in a batching tank or mixing tank which measures in the required quantities of ingredients. Where pectin is the hydrocolloid gelling agent, then this is mixed in the required amount with sugar, water and acid, and other ingredients are added in the required quantities following cooking of this preliminary pectin solution.

The batching tank may contain a sonicator for applying ultrasound frequency vibrational energy to the liquid jelly confectionery composition in this location. The sonicator may additionally, or alternatively, be located in the other positions described herein.

From the batching tank, the liquid jelly confectionery composition, or a combination of some of the ingredients for forming the liquid jelly confectionery composition, are passed through fluid conduits to a cooker in which the liquid jelly confectionery composition or first mixture of ingredients (without the heat-sensitive ingredients such as acid, colour and flavour) is cooked to the required temperature or the required solids content. This may be preceded by a preheating stage to raise the temperature of the liquid jelly confectionery composition or first mixture of ingredients prior to cooking. Preheating may be effected by an in-line heating device such as a shell-in-tube heating device, a plate heat exchanger, heating in the mixing tank, a combination of these processes or otherwise. Cooking can be conducted in any suitable equipment such as a coil cooker, microfilm cooker, microwave, jet cooker or otherwise.

Where pectin is the hydrocolloid, after cooking of the pectin solution, the remaining ingredients of the liquid jelly confectionery composition are mixed with the cooked pectin solution.

The hot, cooked jelly confectionery composition may then be cooled to the deposition temperature or a temperature that is closer to the deposition temperature (for example, within 5° C. of the deposition temperature). The cooling may be effected by an equivalent heat exchanger, a vacuum vessel or otherwise. Cooling may not be required. For example, cooling is not required and is to be avoided when carageenan is the hydrocolloid gelling agent, to prevent premature gelling of the composition.

A sonicator for applying ultrasound frequency vibrational energy to the liquid jelly confectionery composition may be located following cooling.

Prior to deposition, the heat-sensitive ingredients such as acid, visual effect agent such as colour and flavour (where desired) are added and mixed with the liquid jelly confectionery composition. In the following description "colour" is used as the specific example of a visual effect agent. Typically acid and flavour are added at this stage, and depending on the desired colour of the jelly, colour may also be added. These ingredients may be added to the liquid jelly confectionery composition in a vessel or in-line in a fluid conduit. These may be added individually or in combination. The stream of liquid jelly confectionery composition may also be divided into multiple streams, and different combinations of acid colour and/or flavour can be added as required for that stream.

A sonicator for applying ultrasonic frequency vibrational energy to the liquid jelly confectionery composition may be located following addition of the acid and flavour, and any colour that may be added. The sonicator may comprise a probe, which may be oriented vertically, or otherwise. The application of ultrasonic frequency vibrational energy (sonication) at this location provides the secondary effect of mixing of the acid and other ingredients with the rest of the liquid jelly confectionery composition. Another advantage is that this location is close to the point of deposition, and the improvements in viscosity obtained from sonication persist for a sufficient period of time to enable the liquid jelly confectionery composition to be deposited prior to the viscosity increasing again. The increase in viscosity may return the viscosity to a level approaching the pre-sonication viscosity, or may return the viscosity completely to the pre-sonication viscosity.

Depositing of the jelly confectionery composition is suitably conducted in a conventional jelly depositor for single component jellies. Such depositors comprise a holding tank, which holds the liquid jelly composition ready for depositing. In the case of centre-filled jellies, the depositor can be a one-shot depositor. This is described in further detail below. The jelly depositor may comprise separate hoppers for jelly confectionery compositions of different colours and flavours, to allow for multiple colour/flavour lines to be produced at the one time. The jelly depositor may be a depositor for producing confectionery products which contain two colours and/or flavours in a pattern, such as a "starlight" pattern.

The liquid jelly confectionery composition is deposited at a temperature that is appropriate for the particular hydrocolloid present in the liquid jelly confectionery composition. This will generally be between about 60° C. and 95° C. For gelatin alone as the hydrocolloid, the temperature will tend to be at the lower end of this range—from 60° C. to 85° C. For agar-agar, pectin and gelatin, gelatin and starch, starch and gums (such as xanthan and locust bean gum), the temperature will tend to be at the upper end, from about 80° C. to 95° C., pectin and carrageenan can be as high as 105° C.

The scale of manufacture of the jelly confectionery composition may be lab-scale, pilot-plant scale or commercial scale. Commercial scale operations are particularly suited to the method of manufacture. This applies particularly to the depositor. Commercial scale depositors are a significant component of equipment on which the method is performed. In these depositors, batches of liquid jelly confectionery (at a temperature close to the depositing temperature) are fed into holding tanks (or hoppers) of the depositor which hold the liquid jelly confectionery, from which the liquid is drawn on to be pumped through the depositing head. The batches of liquid jelly confectionery fed into the holding tanks can be between 50 kg and 800 kg in size, such as between 50 kg-200 kg, 50 kg-300 kg, 100 kg-300 kg, 100 kg-400 kg, 100 kg-200 kg, 200 kg-400 kg, 300 kg-400 kg, 300 kg-500 kg, 300 kg-600 kg, 400 kg-600 kg, 400 kg-700 kg, 500 kg-700 kg, 500 kg-800 kg, 600 kg-800 kg. It generally follows that the larger the batch size, the longer the time period during which the liquid jelly confectionery composition remains in the holding tank, and the longer the time progresses from the point of addition of heat-sensitive ingredients, and commencement of the viscosity reduction/ultrasonic treatment. The time period between the point of commencement of ultrasonic treatment and deposition, and/or the time period between the point of addition of heat-sensitive ingredients and deposition is suitably between 10 minutes and 4 hours (240 minutes). The time period may be a maximum of between 10-120 minutes, 10-80 minutes, 15-80 minutes, 15-60 minutes, 15-100 minutes, 15-120 minutes, 15-30 minutes, 20-120 minutes, 30-120 minutes, 30-180 minutes, 40-180 minutes, 60-180 minutes, 40-240 minutes, 60-240 minutes, 80-240 minutes, 80-180 minutes, 120-240 minutes, 120-180 minutes, or 150-240 minutes. Jelly in the holding tank which remains after the maximum time period has passed should be rejected.

The vessel size, batch size, the time period during which liquid jelly confectionery material remains in the holding tank, line speeds, ultrasound settings and the time period during which the viscosity reduction persists in the liquid jelly confectionery material, should be controlled or taken into account when ensuring the viscosity reduction persists during deposition.

Centre-Filled Jellies

The centre-filling of a centre-filled jelly may be of a wide range of compositions. The centre-filling may be a thin or "runny" liquid, a viscous liquid, a thickened liquid, a gelled liquid, a jelly, solid, particulate, chocolate or otherwise.

According to one embodiment, the centre-filling is a gelled liquid that exhibits thermo-reversible gelling properties. By way of explanation, the centre filling is in gel form at room temperature, liquefies (becomes more fluid) on heating, and returns to the gel form again on cooling.

According to one embodiment, the centre-filling is a thickened liquid containing a thickening agent. The thickened liquid filling suitably comprises a thickener, in an amount sufficient to provide thickening without complete gelling of the centre-filling.

According to one embodiment, the centre-filling provides a textural difference to the outer jelly shell of the centre-filled jelly that can be detected on the tongue.

The centre filling may comprise more than one centre filling material, such as two different immiscible liquids or two fillings having one or more differing characteristics such as colour, flavour, texture, viscosity, or a combination thereof.

The centre filling suitably comprises a bulk sweetener of one of the types mentioned previously, a thickener, a humectant, water, acid, flavour and colour, and optionally other ingredients. The optional additional ingredients may be any of the optional ingredients identified above for the jelly confectionery composition.

For the preparation of centre-filled jellies a one-shot depositor can be used. One shot depositors are well known in the confectionery industry and are available from a range of suppliers.

One-shot depositors comprise a holding tank for the outer shell (which is prepared from the liquid jelly confectionery material) and a holding tank for the centre-filling. The depositor may further comprise additional holding tanks for outer shells of different compositions—such as two different outer shell compositions of different colours and flavours, which can be used to make single-colour casings, or "starlight" casings. The holding tanks are typically jacketed and can be independently temperature controlled. The holding tank for the outer shell is held at the desired depositing temperature for the outer shell, and the holding tank for the centre-filling is held at the desired depositing temperature for the centre-filling. Suitable depositing temperatures for the outer shell prepared from the liquid jelly confectionery composition are as described previously. Suitable depositing temperatures for the centre filling range from 40° C. to 95° C. The temperature will typically be similar to the depositing temperature for the outer shell, but may be lower or higher than this.

According to another embodiment, there is provided a centre-filled jelly confectionery comprising
a centre filling,
a casing, and
a backing layer, wherein the backing layer has a different visual appearance compared to the casing.

The centre-filled jelly confectionery can be formed by the process described previously, or by any other process known in the art.

According to this embodiment, the casing and the coloured backing layer have a different colour, visual appearance or different colour intensity. The difference may be a combination of these. Such a product provides new and interesting visual effects. As an example, a non-colour based visual effect agent, such as a shimmering agent, can be used in either the casing or in the backing layer. When the confectionery piece is bitten, a new, interesting design with a shimmer in either the casing or the backing layer will be observed. In another variant, the casing may be a foamed casing, and the backing layer is a coloured, translucent backing layer, providing an interesting opaque appearance with a glossy coloured area on one side. When bitten, the coloured filling is also observed coming out of the opaque casing. In a further variant, the casing may be coloured to a light colour intensity, and the backing layer may be coloured to a deeper intensity of the same colour, a close colour, or a different colour. This provides yet another interesting visual effect, providing a distinctive, rich and luxurious product. In yet a further variant, the casing may be in the form of a "starlight" pattern, and the backing layer can be in a different, non-starlight design (such as a single colour, or a glitter effect).

According to one embodiment, the backing layer is not a foamed backing layer.

The different colour, visual effect and/or colour intensities for the different parts of the centre-filled confectionery can be achieved by appropriate selection of the agent(s) for producing the desired effect and the amount. Thus, suitable combinations can be as follows:

| Casing component | Backing component |
| --- | --- |
| Colour pigment at a concentration to give a light colour | Same colour pigment as for the casing, but at a greater concentration to give a darker intensity of the same colour. |
| Colour pigment at a concentration to give a light colour | Different colour agent compared to the casing, of the same or similar colour, at a concentration that provides a darker colour intensity. |
| Shine, shimmer or sparkle agent (such as one selected from the list above available from Merck) | A colour pigment that gives a colour effect only, at a concentration to give the desired colour intensity. |
| A colour pigment that gives a colour effect only, at a concentration to give the desired colour intensity. | Shine, shimmer or sparkle agent (such as one selected from the list above available from Merck) |
| Micro-encapsulated flavour beads | A colour pigment that gives a colour effect only, at a concentration to give the desired colour intensity. |
| A colour pigment that gives a colour effect only, at a concentration to give the desired colour intensity. | Micro-encapsulated flavour beads |
| Two pigments used to colour two different confectionery streams, to produce a | One of the two pigments, at the same concentration or a different concentration as |

-continued

| Casing component | Backing component |
|---|---|
| starlight effect, each being used at a concentration to give the desired colour intensity for each stream. | used to produce the starlight effect in the casing. |
| Two pigments used to colour two different confectionery streams, to produce a starlight effect, each being used at a concentration to give the desired colour intensity for each stream. | A different pigment compared to the two pigments used to produce the starlight effect, at a concentration to produce the desired colour intensity. |
| Two pigments used to colour two different confectionery streams, to produce a starlight effect, each being used at a concentration to give the desired colour intensity for each stream. | Shine, shimmer or sparkle agent (such as one selected from the list above available from Merck) |
| No pigment, but use of foaming to create a white opaque case | Colour pigment at a concentration to give the desired colour intensity |
| No pigment, but use of foaming to create a white opaque case | Shine, shimmer or sparkle agent (such as one selected from the list above available from Merck) |
| A colour pigment and the use of foaming to create a coloured opaque casing of the desired depth of colour. | Colour pigment at a concentration to give the desired colour intensity. |
| A combination of a colour pigment and a shimmer, pearl or sparkle agent, at concentrations to give the desired depth of colour and "non-colour visual effect" | A colour pigment of the same colour and concentration as in the casing. |
| A combination of a colour pigment and a shimmer, pearl or sparkle agent, at concentrations to give the desired depth of colour and "non-colour visual effect" | A different colour pigment, and of a different colour compared to the casing, at a concentration to give the desired colour intensity. |
| A colour pigment at a concentration to give the desired depth of that colour | A combination of the same colour pigment as in the casing and a shimmer, pearl or sparkle agent, at concentrations to give the desired depth of colour and "non-colour visual effect". |
| A colour pigment at a concentration to give the desired depth of that colour | A combination of a different colour pigment compared to the casing and a shimmer, pearl or sparkle agent, at concentrations to give the desired depth of colour and "non-colour visual effect". |
| A colour pigment and the use of foaming to create a coloured opaque casing of the desired depth of colour. | A colour pigment and the use of foaming to create a coloured opaque backing of the desired depth of colour. |
| A colour pigment and the use of foaming to create a coloured opaque casing of the desired depth of colour. | Shine, shimmer or sparkle agent (such as one selected from the list above available from Merck) |
| Colour pigment and the use of foaming at a concentration to give a light colour | Same colour pigment as for the casing, but at a greater concentration to give a darker intensity of the same colour with the use of foaming. |
| Colour pigment and the use of foaming at a concentration to give a light colour | Different colour pigment as for the casing, but at a greater concentration to give a darker intensity of the same colour with the use of foaming. |
| A colour pigment and the use of foaming to create a coloured opaque casing of the desired depth of colour. | Micro-encapsulated flavour beads |

Combinations or different permutations of the above casing and backing components can also be used.

According to one embodiment, there is provided a centre-filled jelly confectionery comprising
a coloured centre filling,
a casing comprising a colouring agent, and
a backing layer comprising said colouring agent of the casing, wherein the concentration of said colouring agent in the backing layer is greater than in the casing.

According to this embodiment, the coloured backing layer contains the "same colour", or the same colouring agent as the casing, but is present in a greater concentration. The concentration in the backing layer may be such as to produce a product which appears to have a deeper coloured base compared to the upper surface. Generally it is desired for the filling to be visible through the coloured casing, although it may not be visible through the backing layer, which is deeper in colour.

According to one variant, the centre-filled jelly comprises
a coloured centre filling,
an uncoloured casing, and
a coloured backing layer, applied to one side of the colourless casing.

It has been found by the applicant that by applying a layer of coloured jelly confectionery material onto one side of the product over an uncoloured casing, a distinctive and attractive appearance is provided to the product. The appearance is a luminescent effect or luminescent appearance.

In all of these centre-filled, backed confectionery jelly products, the application of an additional layer of the outer jelly confectionery material on the exposed surface after one-shot deposition of the preliminary product comprising a centre filling and the casing, provides an additional layer to seal in the centre filling. Centre fillings in centre-filled confectionery compositions are subject to the risk of leakage. For this reason, many centre-filled jelly confectionery products are packaged in rigid plastic containers, rather than thin plastic films, particularly for liquid or non-set centre fillings. By applying a second backing layer to the confectionery composition, this provides an additional degree of protection from leakage of the centre filling.

The casing, or outer shell, is formed from a liquid jelly confectionery composition (which may be uncoloured in the case of the uncoloured casing variant) which encases a centre filling. The backing layer (which may be coloured, as in the case of one variant) is formed from a liquid jelly confectionery composition which is applied over one section, or one side of the casing that encases the centre filling.

"Uncoloured" or similarly "colourless or substantially colourless" refers to the absence of a specific colouring agent. Thus, the jelly confectionery material used to form an uncoloured casing will not contain a specific colouring agent. The casing or jelly may have a slight opacity or cloudiness which may appear slightly creamy or yellowish in appearance, depending on the gelling agent, however this is not to be considered to constitute colouring. The casing is relatively clear and translucent. For the avoidance of any confusion, if another ingredient in the liquid jelly confectionery composition included for another purpose, such as a fruit juice concentrate for flavour, also has the effect of colouring the composition, then this should be considered to be a "colouring agent" and to produce a "coloured" product. The degree of colouring is assessed independently of the purpose for the addition of the ingredient.

When a coloured backing layer is applied, the colouring of the backing layer is provided by the inclusion of a colouring agent in the backing layer. Thus, the liquid jelly confectionery composition forming the backing layer comprises a colouring agent. The coloured backing layer contains colour, but is translucent, rather than opaque.

The liquid jelly confectionery composition used to form the backing layer may be the same as that used to form the casing that encases the centre filling, but for the differences in the colouring agent, colour pigment, or any other visual effect pigment which may or may not be present in the backing and casing, respectively. Using the example of the variant where the casing is uncoloured and the backing layer is coloured, in manufacture, a single liquid jelly confectionery composition may be produced and divided into two streams, one of which is directed to the holding tank for the formation of the casing (for instance, in a one-shot depositor), and the second of which is directed to a separate holding tank for the deposition of a backing layer. In one embodiment, the centre filling and casing (which may be uncoloured according to some embodiments) are deposited into a mould using a one-shot depositor. The deposited product of the centre filling and casing then passes beneath a second depositing station where the backing layer is deposited on top of the exposed surface of the previously-deposited product comprising the casing and centre-filling.

In an alternative embodiment, the liquid jelly confectionery composition used for forming the backing layer may be of a different composition to that forming the casing.

According to another variation, the centre-filled jelly confectionery comprises:
a coloured centre filling,
a casing comprising a colouring agent, and
a backing layer comprising said colouring agent of the casing,
wherein the concentration of said colouring agent in the backing layer is greater than in the casing.

According to this variation, the coloured backing layer contains the "same colour", or the same colouring agent as the casing, but is present in a greater concentration. The concentration in the backing layer may be such as to produce a product which appears to have a deeper coloured base, and a lighter coloured upper surface. Generally it is desired for the filling to be visible through the coloured casing, although it may not be visible through the backing layer, which is deeper in colour. This product can be prepared through the same techniques as described above for the product having an uncoloured case.

According to further embodiments, the same liquid jelly confectionery composition is used to form the casing and the backing layer, with the same colouring agent and concentration for each. In production, a stream of liquid jelly confectionery composition is directed to the holding tank for the casing composition, and another stream is directed to the holding tank for the backing layer. According to some embodiments, the colouring agent is present at a concentration that results in a dark coloured shell through which the centre filling is difficult to see.

Mould

The jelly confectionery product, which may be a centre-filled jelly confectionery product, is deposited into a mould. The mould may be a starch mould or a starchless mould. Such mould types are well known in the art.

Shapes

The shape of the mould may be of any desired configuration, such as a fruit-shape, a character-shape, or otherwise. In the case of centre-filled products, the mould should contain a sufficiently large central volume to enable the deposition of a central volume of the centre-filling, which can be completely encased in the casing material.

Further Variations

Jelly confectionery products can contain further confectionery components or ingredients as desired. As one example, the jelly confectionery (which may be the centre-filled jelly confectionery) could be subjected to panning or another form of coating with another confectionery layer. The panning may be soft panning, hard panning, or chocolate panning. The jelly confectionery product could alternatively be incorporated into a larger confectionery article. As one example, the jelly confectionery could form an inclusion in a chocolate bar, an iced confection, an icecream, or otherwise.

EXAMPLES

Various embodiments will now be described with reference to the following non-limiting examples and figures which illustrate processes for the production of a jelly confectionery products according to various embodiments of the invention.

In FIGS. 1 to 20, the given reference numerals refer as follows:

1. Weigh & Mix
2. Cooking
2*a*. Pre-Cook (2 step operation)
3. Cooling
4. Application of ultrasonic frequency vibrational energy to jelly stream
4'. Application of ultrasonic frequency vibrational energy to centre filling
5. Addition to jelly of acid, and fruit juice concentrate when used
6. Addition to jelly of flavour+acid, and fruit juice concentrate when used
6*a*. Addition to jelly of flavour
7. Addition to jelly of colour+flavour+acid, and fruit juice concentrate, when used
7*a*. Flavour and/or colour addition to jelly
8. Centre filling supply hopper
9. Centre filling depositor hopper 1
10. Centre filling depositor hopper 2
11. Shell depositor hopper 1
12. Shell depositor hopper 2
13. Backing off depositor hopper 1
14. Backing off depositor hopper 2
15. Jelly aeration unit (Mondo Mix)
16. Starlight nozzle plate
17. Co-depositing nozzle plate
18. Starch moulding mogul tray
19. single deposit nozzle plate Formulations for the liquid jelly confectionery material, used to form the casing and the backing layer in the case of centre-filled products, or for forming the non-centre-filled product as the case may be, are outlined in Table 1. Formulations for the centre filling are outlined in Table 2, where the product is a centre filled jelly.

Figure 21:
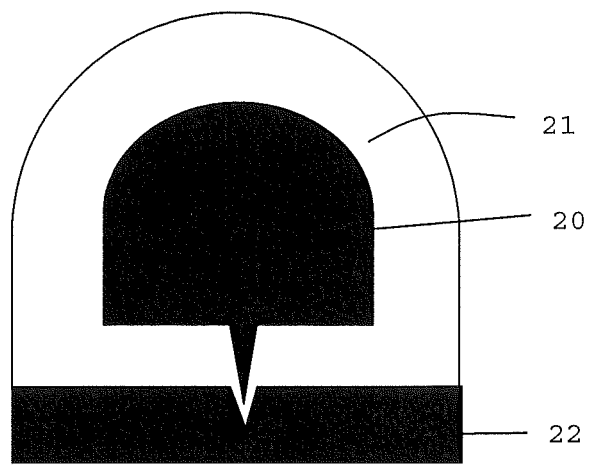
FIG. 21 is an illustration of a centre-filled jelly confectionery according to one embodiment of the invention.

According to some embodiments, the confectionery product is a centre-filled jelly of the type illustrated schematically in FIG. 21, comprising a coloured centre filling 20, an uncoloured casing 21, and a coloured backing layer 22. As illustrated schematically, the centre filling 20 and casing 21 include a slight tail, and in some cases the tail for the centre filling can extend through the casing. By applying a backing layer, the possible leakage point of the tail of centre filling 20 is covered. The coloured backing layer 22 of the product represented in FIG. 21 provides a luminescent glow to the product, particularly when viewed from above through the clear outer casing 21.

According to other embodiments, the confectionery product comprises a centre filling 20, a casing 21*a* and a backing layer 22*a*, in which the casing and backing layers have different visual effects. This product has the same general arrangement of layers as illustrated in FIG. 21, but for the use of different colour or visual effect agents (or the use of varying amounts of such agents) in each of the casing and backing layer. The visual effect of the casing of some examples are:
a single colour (light or dark),
a starlight design of two colours or effects,
a visual effect pigment providing a shimmer, sparkle, shine or pearlescent effect,
a foamed, opaque casing.

The visual effect of the backing layer of some examples are:
a single colour darker than in the casing,
a visual effect pigment providing a shimmer, sparkle, shine or pearlescent effect,
colour pigment and a visual effect pigment,
a single colour that is different to the colour of the casing.

According to other embodiments, the confectionery product comprises a coloured centre filling 20, a casing which is coloured through the use of a colouring agent, and a backing layer which is coloured through the use of the same colouring agent as the casing, but is present in a greater concentration to give a deeper colour of base. This product has the same general arrangement of layers as illustrated in FIG. 21, but for the presence of colouring agent in the casing 21.

TABLE 1

| Example No. | Base Recipe Ingredients | % | Cooking Temp (° C.) | Depositing Temp (° C.) | Process Flow Diagram Options | Outline of Jelly Making Process |
|---|---|---|---|---|---|---|
| 1 | Sugar (refined) Glucose Syrup HM43 Gelatine (250 Bloom) Starch Fruit Juice Concentrate Water | 30.82 36.05 4.78 4.93 0.42 22.99 | 137 Range: 134-140 | Range: 85-95 | FIG. 1, 4, 5, 8, 9, 10, 11, 12, 13, 15, 20 | Weigh, mix and heat all ingredients except fruit juice concentrate to 55° C. in a mixing kettle. Pre-heat up to 80° C. +/− 2° C. Heat up to 137° C. +/− 3° C. Cool to 90° C. Add acids @ 1.0-3.0% rate and add flavour. Colour is added for single-deposit products, or to a stream of the jelly for backing layer for centre-filled products. Pump stream or streams into holding tank(s) for depositing. Convey filling into holding tank for depositing (Centre Frill only). |
| 2 | Sugar (Refined) Glucose Syrup HM43 Gelatine (250 Bloom) Water | 43.98 35.45 14.72 5.85 | 106 Range: 103-109 | 69-71 | FIG. 1, 4, 5, 8, 9, 10, 11, 12, 13, 15, 20 | Weigh, mix and heat all ingredients except fruit juice concentrate to 55° C. in a mixing kettle. Pre-heat up to 90° C. +/− 2° C. Heat up to 106° C. +/− 3° C. Cool to 70° C. Add acids @ 1.0-3.0% rate and add flavour. Colour is added for single-deposit products, or to a stream of the jelly for backing layer for centre-filled products. Pump stream or streams into holding tank(s) for depositing. Convey filling into holding tank for depositing (Centre Frill only). |
| 3 | Sugar (refined) Glucose Syrup HM43 Gelatine (250 Bloom) Starch Fruit Juice Concentrate Water | 30.11 35.22 4.67 4.81 0.45 24.73 | 137 Range: 134-140 | 85-95 | FIG. 1, 4, 5, 8, 9, 10, 11, 12, 13, 15, 20 | Weigh, mix and heat all ingredients except fruit juice concentrate to 55° C. in a mixing kettle. Pre-heat up to 80° C. +/− 2° C. Heat up to 137° C. +/− 3° C. Cool to 90° C. Add acids @ 1.0-3.0% rate and add flavour. Colour is added for single-deposit products, or to a stream of the jelly for backing layer for centre-filled products. Pump stream or streams into holding tank(s) for depositing. Convey filling into holding tank for depositing (Centre Frill only). |
| 4 | Starch Glucose Syrup HM43 Sugar (Refined) Water | 6.37 43.63 30.81 19.19 | 137 Range: 134-140 | 85-95 | FIG. 1, 4, 5, 8, 9, 10, 11, 12, 13, 15, 20 | Weigh, mix and heat all ingredients except fruit juice concentrate to 55° C. in a mixing kettle. Pre-heat up to 80° C. +/− 2° C. Heat up to 137° C. +/− 3° C. Cool to 90° C. Add acids @ 1.0-3.0% rate and add flavour. Colour is added for single-deposit products, or to a stream of the jelly for backing layer for centre-filled products. Pump stream or streams into holding tank(s) for depositing. |

TABLE 1-continued

| Example No. | Base Recipe Ingredients | % | Cooking Temp (° C.) | Depositing Temp (° C.) | Process Flow Diagram Options | Outline of Jelly Making Process |
|---|---|---|---|---|---|---|
| 5 | Sugar (refined)<br>Glucose Syrup HM43<br>Gelatine (250 Bloom)<br>Starch<br>Fruit Juice Concentrate<br>Water | 24.36<br>46.75<br>6.96<br>1.57<br>20.36 | 137<br>Range:<br>134-140 | 85-95 | FIG. 1, 4, 5, 8,<br>9, 10, 11, 12,<br>13, 15, 20 | Weigh, mix and heat all ingredients except fruit juice concentrate to 55° C. in a mixing kettle. Pre-heat up to 80° C. +/− 2° C. Heat up to 137° C. +/− 3° C. Cool to 90° C. Add acids @ 1.0-3.0% rate and add flavour. Colour is added for single-deposit products, or to a stream of the jelly for backing layer for centre-filled products. Pump stream or streams into holding tank(s) for depositing. Convey filling into holding tank for depositing (Centre Frill only). |
| 6 | Sugar (Refined)<br>Glucose Syrup HM43<br>Agar<br>Water | 33.33<br>21.05<br>1.18<br>44.44 | 110<br>Range:<br>107-113 | 85-90 | FIG. 1, 4, 5, 8,<br>9, 10, 11, 12,<br>13, 15, 20 | Weigh, mix and heat all ingredients except fruit juice concentrate to 55° C. in a mixing kettle. Pre-heat up to 80° C. +/− 2° C. Heat up to 110° C. +/− 3° C. Cool to 90° C. Add acids @ 1.0-3.0% rate and add flavour. Colour is added for single-deposit products, or to a stream of the jelly for backing layer for centre-filled products. Pump stream or streams into holding tank(s) for depositing. Convey filling into holding tank for depositing (Centre Frill only). |
| 7 | Sugar (Refined)<br>Glucose Syrup HM43<br>Agar<br>Water | 32.00<br>16.00<br>1.50<br>50.50 | 110<br>Range:<br>107-113 | 85-90 | FIG. 1, 4, 5, 8,<br>9, 10, 11, 12,<br>13, 15, 20 | Weigh, mix and heat all ingredients except fruit juice concentrate to 55° C. in a mixing kettle. Heat up to 110° C. +/− 3° C. Cool to 90° C. Add acids @ 1.0-3.0% rate and add flavour. Colour is added for single-deposit products, or to a stream of the jelly for backing layer for centre-filled products. Pump stream or streams into holding tank(s) for depositing. Convey filling into holding tank for depositing (Centre Frill only). |
| 8 | Glucose Syrup HM43<br>Sugar (Refined)<br>Gelatine (250 Bloom)<br>Water<br>Invert Sugar | 26.55<br>39.68<br>6.00<br>15.87<br>11.90 | 106<br>Range:<br>103-109 | 69-71 | FIG. 1, 4, 5, 8,<br>9, 10, 11, 12,<br>13, 15, 20 | Weigh, mix and heat all ingredients except fruit juice concentrate to 55° C. in a mixing kettle. Pre-heat up to 90° C. +/− 2° C. Heat up to 106° C. +/− 3° C. Cool to 70° C. Add acids @ 1.0-3.0% rate and add flavour. Colour is added for single-deposit products, or to a stream of the jelly for backing layer for centre-filled products. Pump stream or streams into holding tank(s) for depositing. Convey filling into holding tank for depositing (Centre Frill only). |
| 9 | Sugar (Refined)<br>Glucose Syrup HM43<br>Gelatine (250 Bloom)<br>Invert Sugar<br>Water | 33.12<br>33.12<br>6.00<br>15.87<br>11.90 | 106<br>Range:<br>103-109 | 69-71 | FIG. 1, 4, 5, 8,<br>9, 10, 11, 12,<br>13, 15, 20 | Weigh, mix and heat all ingredients except fruit juice concentrate to 55° C. in a mixing kettle. Pre-heat up to 90° C. +/− 2° C. Heat up to 106° C. +/− 3° C. Cool to 70° C. Add acids @ 1.0-3.0% rate and add flavour. Colour is added for single-deposit products, or to a stream of the jelly for backing layer for centre-filled products. Pump stream or streams into holding tank(s) for depositing. Convey filling into holding tank for depositing (Centre Frill only). |
| 10 | Sugar (Refined)<br>Glucose Syrup HM43<br>Gelatine (250 Bloom)<br>Invert Sugar<br>Water | 35.00<br>31.23<br>6.00<br>15.87<br>11.90 | 106<br>Range:<br>103-109 | 69-71 | FIG. 1, 4, 5, 8,<br>9, 10, 11, 12,<br>13, 15, 20 | Weigh, mix and heat all ingredients except fruit juice concentrate to 55° C. in a mixing kettle. Pre-heat up to 90° C. +/− 2° C. Heat up to 106° C. +/− 3° C. Cool to 70° C. |

TABLE 1-continued

| Example No. | Base Recipe Ingredients | % | Cooking Temp (° C.) | Depositing Temp (° C.) | Process Flow Diagram Options | Outline of Jelly Making Process |
|---|---|---|---|---|---|---|
| 11 | Sugar (Refined)<br>Glucose Syrup HM43<br>Gelatine (250 Bloom)<br>Water | 62.50<br>16.88<br>6.87<br>13.75 | 106<br>Range:<br>103-109 | 69-71 | FIG. 1, 4, 5, 8, 9, 10, 11, 12, 13, 15, 20 | Add acids @ 1.0-3.0% rate and add flavour. Colour is added for single-deposit products, or to a stream of the jelly for backing layer for centre-filled products.<br>Pump stream or streams into holding tank(s) for depositing.<br>Convey filling into holding tank for depositing (Centre Frill only).<br>Weigh, mix and heat all ingredients except fruit juice concentrate to 55° C. in a mixing kettle.<br>Pre-heat up to 90° C. +/− 2° C.<br>Heat up to 106° C. +/− 3° C.<br>Cool to 70° C.<br>Add acids @ 1.0-3.0% rate and add flavour. Colour is added for single-deposit products, or to a stream of the jelly for backing layer for centre-filled products.<br>Pump stream or streams into holding tank(s) for depositing.<br>Convey filling into holding tank for depositing (Centre Frill only). |
| 12 | Sugar (Refined)<br>Glucose Syrup HM43<br>Gelatine (250 Bloom)<br>Water | 71.17<br>13.52<br>4.63<br>10.68 | 106<br>Range:<br>103-109 | 69-71 | FIG. 1, 4, 5, 8, 9, 10, 11, 12, 13, 15, 20 | Weigh, mix and heat all ingredients except fruit juice concentrate to 55° C. in a mixing kettle.<br>Pre-heat up to 90° C. +/− 2° C.<br>Heat up to 106° C. +/− 3° C.<br>Cool to 70° C.<br>Add acids @ 1.0-3.0% rate and add flavour. Colour is added for single-deposit products, or to a stream of the jelly for backing layer for centre-filled products.<br>Pump stream or streams into holding tank(s) for depositing.<br>Convey filling into holding tank for depositing (Centre Frill only). |
| 13 | Sugar (Refined)<br>Glucose Syrup HM43<br>Invert Sugar<br>Pectin (150 slow set)<br>Carrageenan (X8302)<br>Water | 37.94<br>36.14<br>4.52<br>1.04<br>0.32<br>20.04 | 113<br>Range:<br>110-116 | 104-106 | FIG. 14<br>FIG. 16 | Mix and heat all sugar ingredients + water 75-80° C. - Part 1<br>Premix all hydrocolloids with some sugar, and slowly add to Part 1<br>High shear mix for 6-8 minutes.<br>Cook up to 113° C. +/− 2° C.<br>* No cooling for carageenan formulations.<br>Add acids @ 1.0-3.0% rate and add flavour. Colour is added for single-deposit products, or to a stream of the jelly for backing layer for centre-filled products.<br>Pump stream or streams into holding tank(s) for depositing.<br>Convey filling into holding tank for depositing (Centre Frill only). |
| 14 | Sugar (Refined)<br>Glucose Syrup HM43<br>Pectin (LM 102 AS)<br>Carrageenan (X8302)<br>Water<br>Sodium citrate | 31.47<br>39.30<br>0.43<br>1.90<br>26.47<br>0.43 | 111<br>Range:<br>108-114 | 104-106 | FIG. 14<br>FIG. 16 | Mix and heat glucose + water to 80-83° C. - Part 1.<br>Premix all hydrocolloids with ~10% of total pwd sugar, and slowly add to Part 1.<br>High shear mix for 12 mins and add sodium citrate and hold 1 min.<br>Add remaining sugar and mix for 5 mins. to form even slurry.<br>Cook up to 113° C. +/− 2° C.<br>* No cooling for carageenan formulations.<br>Add acids @ 1.0-3.0% rate and add flavour. Colour is added for single-deposit products, or to a stream of the jelly for backing layer for centre-filled products.<br>Pump stream or streams into holding tank(s) for depositing.<br>Convey filling into holding tank for depositing (Centre Frill only). |
| 15 | Sugar (Refined)<br>Glucose Syrup 41De<br>Pectin (DD very slow set)<br>Glycerol monosterate (GMS)<br>Invert Sugar<br>Sodium citrate | 33.40<br>34.30<br>0.75<br>0.03<br>3.20<br>0.11 | 111<br>Range:<br>108-114 | 83-85 | FIG. 2, 3, 6, 7, 17, 18 | Make up Pectin soln. with hot water @ 80-82° C. add Anhy. Citric and NaCitrate - Part 1.<br>Mix all sugars with GMS and pectin soln. (Part 1) and cook to 108° C.<br>Cool to 92° C. |

TABLE 1-continued

| Example No. | Base Recipe Ingredients | % | Cooking Temp (° C.) | Depositing Temp (° C.) | Process Flow Diagram Options | Outline of Jelly Making Process |
|---|---|---|---|---|---|---|
| | Anhydrous citric acid | 0.03 | | | | Add Gelatine 250 soln. and mix. |
| | Gelatine (250 Bloom) | 9.10 | | | | Add acids @ 1.0-3.0% rate and add |
| | Water | 19.08 | | | | flavour. Colour is added for single-deposit products, or to a stream of the jelly for backing layer for centre-filled products. Pump stream or streams into holding tank(s) for depositing. Convey filling into holding tank for depositing (Centre Frill only). |
| 16 | Sugar (Refined) | 30.11 | 137 | 85-95 | FIG. 1, 4, 5, 8, | Weigh, mix and heat all ingredients |
| | Glucose Syrup HM43 | 45.00 | Range: | | 9, 10, 11, 12, | except fruit juice concentrate |
| | Starch | 6.00 | 134-140 | | 13, 15, 20 | to 55° C. in a mixing kettle. |
| | Xanthan Gum | 0.2 | | | | Pre-heat up to 80° C. +/− 2° C. |
| | Locust Bean gum | 0.2 | | | | Heat up to 137° C. +/− 3° C. |
| | Fruit Juice Concentrate | 4.45 | | | | Cool to 90° C. |
| | Water | 14.04 | | | | Add acids @ 1.0-3.0% rate and add flavour. Colour is added for single-deposit products, or to a stream of the jelly for backing layer for centre-filled products. Pump stream or streams into holding tank(s) for depositing. Convey filling into holding tank for depositing (Centre Frill only). |
| 17 | Sugar (Refined) | 19.50 | 137 | 85-95 | FIG. 1, 4, 5, 8, | Weigh, mix and heat all ingredients |
| | Glucose Syrup HM43 | 29.10 | Range: | | 9, 10, 11, 12, | except fruit juice concentrate |
| | Starch | 6.00 | 134-140 | | 13, 15, 20 | to 55° C. in a mixing kettle. |
| | Xanthan Gum | 0.2 | | | | Pre-heat up to 80° C. +/− 2° C. |
| | Locust Bean gum | 0.2 | | | | Heat up to 137° C. +/− 3° C. |
| | Fruit Juice Concentrate | 4.5 | | | | Cool to 90° C. |
| | Water | 40.5 | | | | Add acids @ 1.0-3.0% rate and add flavour. Colour is added for single-deposit products, or to a stream of the jelly for backing layer for centre-filled products. Pump stream or streams into holding tank(s) for depositing. Convey filling into holding tank for depositing (Centre Frill only). |
| 18 | Sugar (Refined) | 14.80 | 110 | 85-90 | FIG. 1, 4, 5, 8, | Weigh, mix and heat all ingredients |
| | Glucose Syrup HM43 | 56.50 | Range: | | 9, 10, 11, 12, | except fruit juice concentrate |
| | Agar | 2.40 | 107-113 | | 13, 15, 20 | to 55° C. in a mixing kettle. |
| | Fruit Juice Concentrate | 3.70 | | | | Pre-heat up to 80° C. +/− 2° C. |
| | Water | 22.60 | | | | Heat up to 110° C. +/− 3° C. Cool to 90° C. Add acids @ 1.0-3.0% rate and add flavour. Colour is added for single-deposit products, or to a stream of the jelly for backing layer for centre-filled products. Pump stream or streams into holding tank(s) for depositing. Convey filling into holding tank for depositing (Centre Frill only). |
| 19 | Sugar (Refined) | 18.60 | 110 | 85-90 | FIG. 1, 4, 5, 8, | Weigh, mix and heat all ingredients |
| | Glucose Syrup 41De | 28.20 | Range: | | 9, 10, 11, 12, | except fruit juice concentrate |
| | Invert Sugar | 5.70 | 107-113 | | 13, 15, 20 | to 55° C. in a mixing kettle. |
| | Agar | 2.00 | | | | Pre-heat up to 80° C. +/− 2° C. |
| | Fruit Juice Concentrate | 4.00 | | | | Heat up to 110° C. +/− 3° C. |
| | Water | 41.50 | | | | Cool to 90° C. Add acids @ 1.0-3.0% rate and add flavour. Colour is added for single-deposit products, or to a stream of the jelly for backing layer for centre-filled products. Pump stream or streams into holding tank(s) for depositing. Convey filling into holding tank for depositing (Centre Frill only). |
| 20 | Sugar (Refined) | 42.00 | 111 | 83-85 | FIG. 2, 3, 6, 7, | Make up Pectin soln. with hot water |
| | Glucose Syrup 41De | 14.00 | Range: | | 17, 18 | @ 80-82° C. add Anhy. Citric |
| | Pectin (DD very slow set) | 0.75 | 108-114 | | | and NaCitrate - Part 1. |
| | Invert Sugar | 3.41 | | | | Mix all sugars with GMS and pectin soln. |
| | Sodium citrate | 0.11 | | | | (Part 1) and cook to 108° C. |
| | Anhydrous citric acid | 0.03 | | | | Cool to 92° C. |
| | Gelatine (250 Bloom) | 9.10 | | | | Add Gelatine 250 soln. and mix. |
| | Water | 30.6 | | | | Add acids @ 1.0-3.0% rate and add flavour. Colour is added for single-deposit products, or to a stream of the jelly for backing layer for centre-filled products. |

TABLE 1-continued

| Example No. | Base Recipe Ingredients | % | Cooking Temp (° C.) | Depositing Temp (° C.) | Process Flow Diagram Options | Outline of Jelly Making Process |
|---|---|---|---|---|---|---|
| 21 | Sugar (Refined) Glucose Syrup 41De Agar Sodium citrate Gelatine (250 Bloom) Water | 43.00 25.00 2.50 0.11 9.10 20.29 | 111 Range: 108-114 | 85-90 | FIG. 2, 3, 6, 7, 17, 18 | Weigh, mix and heat all ingredients except fruit juice concentrate to 55° C. in a mixing kettle. Pre-heat up to 80° C. +/− 2° C. Heat up to 110° C. +/− 3° C. Cool to 90° C. Add acids @ 1.0-3.0% rate and add flavour. Colour is added for single-deposit products, or to a stream of the jelly for backing layer for centre-filled products. Pump stream or streams into holding tank(s) for depositing. Convey filling into holding tank for depositing (Centre Frill only). |
| 22 | Sugar (Refined) Glucose Syrup 41De Gelatine (250 Bloom) Nutriose FB06 Water | 19.00 46.00 7.50 7.50 20.00 | 106 Range: 103-109 | 69-71 | FIG. 1, 4, 5, 8, 9, 10, 11, 12, 13, 15, 20 | Weigh, mix and heat all ingredients except fruit juice concentrate to 55° C. in a mixing kettle. Pre-heat up to 90° C. +/− 2° C. Heat up to 106° C. +/− 3° C. Cool to 70° C. Add acids @ 1.0-3.0% rate and add flavour. Colour is added for single-deposit products, or to a stream of the jelly for backing layer for centre-filled products. Pump stream or streams into holding tank(s) for depositing. Convey filling into holding tank for depositing (Centre Frill only). |
| 23 | Maltitol syrup (75% DS) Gelatine (250 Bloom) Nutriose FB06 Water | 57.00 8.70 14.30 20.00 | 106 Range: 103-109 | 69-71 | FIG. 1, 4, 5, 8, 9, 10, 11, 12, 13, 15, 20 | Weigh, mix and heat all ingredients except fruit juice concentrate to 55° C. in a mixing kettle. Pre-heat up to 90° C. +/− 2° C. Heat up to 106° C. +/− 3° C. Cool to 70° C. Add acids @ 1.0-3.0% rate and add flavour. Colour is added for single-deposit products, or to a stream of the jelly for backing layer for centre-filled products. Pump stream or streams into holding tank(s) for depositing. Convey filling into holding tank for depositing (Centre Frill only). |
| 24 | Sugar (Refined) Glucose Syrup 41De Starch Gum Arabic Fruit Juice Concentrate Water | 35.00 35.00 5.00 5.00 4.45 15.55 | 137 Range: 134-140 | 85-95 | FIG. 1, 4, 5, 8, 9, 10, 11, 12, 13, 15, 20 | Weigh, mix and heat all ingredients except fruit juice concentrate to 55° C. in a mixing kettle. Pre-heat up to 80° C. +/− 2° C. Heat up to 137° C. +/− 3° C. Cool to 90° C. Add acids @ 1.0-3.0% rate and add flavour. Colour is added for single-deposit products, or to a stream of the jelly for backing layer for centre-filled products. Pump stream or streams into holding tank(s) for depositing. Convey filling into holding tank for depositing (Centre Frill only). |
| 25 | Sugar (Refined) Glucose Syrup 41De Starch Invert sugar Gum Arabic Fruit Juice Concentrate Water | 34.00 41.00 3.55 3.00 2.00 4.45 12.00 | 137 Range: 134-140 | 85-95 | FIG. 1, 4, 5, 8, 9, 10, 11, 12, 13, 15, 20 | Weigh, mix and heat all ingredients except fruit juice concentrate to 55° C. in a mixing kettle. Pre-heat up to 80° C. +/− 2° C. Heat up to 137° C. +/− 3° C. Cool to 90° C. Add acids @ 1.0-3.0% rate and add flavour. Colour is added for single-deposit products, or to a stream of the jelly for backing layer for centre-filled products. Pump stream or streams into holding tank(s) for depositing. Convey filling into holding tank for depositing (Centre Frill only). |
| 26 | Sugar (Refined) Glucose Syrup HM43 Gelatine (250 Bloom) | 45.30 36.50 4.50 | 106 Range: 103-109 | 69-71 | FIG. 1, 4, 5, 8, 9, 10, 11, 12, 13, 15, 20 | Weigh, mix and heat all ingredients except fruit juice concentrate to 55° C. in a mixing kettle. |

TABLE 1-continued

| Example No. | Base Recipe Ingredients | % | Cooking Temp (° C.) | Depositing Temp (° C.) | Process Flow Diagram Options | Outline of Jelly Making Process |
|---|---|---|---|---|---|---|
| | Fruit Juice Concentrate | 0.20 | | | | Pre-heat up to 90° C. +/− 2° C. |
| | Water | 13.50 | | | | Heat up to 106° C. +/− 3° C. |
| | | | | | | Cool to 70° C. |
| | | | | | | Add acids @ 1.0-3.0% rate and add flavour. Colour is added for single-deposit products, or to a stream of the jelly for backing layer for centre-filled products. Pump stream or streams into holding tank(s) for depositing. Convey filling into holding tank for depositing (Centre Frill only). |
| 27 | Sugar (Refined) | 31.30 | 106 | 85-95 | FIG. 1, 4, 5, 8, 9, 10, 11, 12, 13, 15, 20 | Weigh, mix and heat all ingredients except fruit juice concentrate to 55° C. in a mixing kettle. Pre-heat up to 80° C. +/− 2° C. Heat up to 137° C. +/− 3° C. Cool to 90° C. Add acids @ 1.0-3.0% rate and add flavour. Colour is added for single-deposit products, or to a stream of the jelly for backing layer for centre-filled products. Pump stream or streams into holding tank(s) for depositing. Convey filling into holding tank for depositing (Centre Frill only). |
| | Glucose Syrup HM43 | 36.60 | Range: 103-109 | | | |
| | Gelatine (250 Bloom) | 3.20 | | | | |
| | Starch | 7.880 | | | | |
| | Fruit Juice Concentrate | 0.40 | | | | |
| | Water | 20.70 | | | | |
| 28 | Sugar (Refined) | 31.10 | 106 | 85-95 | FIG. 1, 4, 5, 8, 9, 10, 11, 12, 13, 15, 20 | Weigh, mix and heat all ingredients except fruit juice concentrate to 55° C. in a mixing kettle. Pre-heat up to 80° C. +/− 2° C. Heat up to 137° C. +/− 3° C. Cool to 90° C. Add acids @ 1.0-3.0% rate and add flavour. Colour is added for single-deposit products, or to a stream of the jelly for backing layer for centre-filled products. Pump stream or streams into holding tank(s) for depositing. Convey filling into holding tank for depositing (Centre Frill only). |
| | Glucose Syrup HM43 | 35.20 | Range: 103-109 | | | |
| | Gelatine (250 Bloom) | 2.00 | | | | |
| | Starch | 10.00 | | | | |
| | Fruit Juice Concentrate | 0.40 | | | | |
| | Water | 21.30 | | | | |
| 29 | Sugar (Refined) | 30.60 | 106 | 85-95 | FIG. 1, 4, 5, 8, 9, 10, 11, 12, 13, 15, 20 | Weigh, mix and heat all ingredients except fruit juice concentrate to 55° C. in a mixing kettle. Pre-heat up to 80° C. +/− 2° C. Heat up to 137° C. +/− 3° C. Cool to 90° C. Add acids @ 1.0-3.0% rate and add flavour. Colour is added for single-deposit products, or to a stream of the jelly for backing layer for centre-filled products. Pump stream or streams into holding tank(s) for depositing. Convey filling into holding tank for depositing (Centre Frill only). |
| | Glucose Syrup HM43 | 35.80 | Range: 103-109 | | | |
| | Gelatine (250 Bloom) | 3.10 | | | | |
| | Starch | 7.60 | | | | |
| | Water | 22.90 | | | | |

TABLE 2

| SAMPLE NUMBER | FILLING DETAILS |
|---|---|
| CF_1A | Blackcurrant Fruit Preparation<br>Supplier: Rudolf Wild GmbH & Co. KG<br>Sample Code: 600032847 |
| CF_1B | Blackcurrant Fruit Filling<br>Supplier: Sensient Technologies Pty Ltd<br>Sample Code: CS0315 |
| CF_1C | Blackcurrant Fruit Juice Filling<br>Ingredients:<br>45% Glucose Syrup, 20% Sucrose, 19% Water, 13% Blackcurrant Juice Concentrate, 1% Pectin, 0.5% Sodium citrate,<br>0.5% Citric Acid, Flavour, Color.<br>Method:<br>1. Heat glucose syrup, water and fruit juice concentrate in a jacketed pan to 65 C. with consistent stirring.<br>2. Add 15% sucrose and cook to 80 C.<br>3. Blend 5% sucrose with pectin and add to boiling mixture in jacketed hopper. |

TABLE 2-continued

| SAMPLE NUMBER | FILLING DETAILS |
|---|---|
| | 4. Cook to 95 C. and hold for 5 minutes, then cool to 70 C.<br>5. Add Citric Acid, Sodium Citrate, color and flavour prior to pumping to depositing tank. |
| CF_1D | Blackcurrant Fruit Pulp Filling<br>Ingredients:<br>45% Sucrose, 20% Fruit Pulp, 17% Glucose Syrup, 16% Water, 0.5% Pectin, 1% Citric Acid, Color, Flavour.<br>Method:<br>1. Blend pectin with 5% sugar, stir into water and heat to 90 deg C.<br>2. Mix fruit pulp, glucose syrup and sugar in a jacketed pan and heat to 90 deg C.<br>3. Add pectin/sugar solution to fruit preparation and boil to 76 Brix.<br>4. Add citric acid solution, color and flavour.<br>5. Pump to depositing tank. |
| CF_2A | Mandarin Fruit Preparation<br>Supplier: Rudolf Wild GmbH & Co. KG<br>Sample Code: 600040061 |
| CF_2B | Mandarin Fruit Filling<br>Supplier: Sensient Technologies Pty Ltd<br>Sample Code: CS0321 |
| CF_2C | Mandarin Fruit Juice Filling<br>Ingredients:<br>45% Glucose Syrup, 20% Sucrose, 19% Water, 13% Mandarin Juice Concentrate, 1% Pectin, 0.5% Sodium citrate,<br>0.5% Citric Acid, Flavour, Color.<br>Method:<br>1. Heat glucose syrup, water and fruit juice concentrate in a jacketed pan to 65 C. with consistent stirring.<br>2. Add 15% sucrose and cook to 80 C.<br>3. Blend 5% sucrose with pectin and add to boiling mixture in jacketed hopper.<br>4. Cook to 95 C. and hold for 5 minutes, then cool to 70 C.<br>5. Add Citric Acid, Sodium Citrate, color and flavour prior to pumping to depositing tank. |
| CF_2D | Mandarin Fruit Pulp Filling<br>Ingredients:<br>45% Sucrose, 20% Fruit Pulp, 17% Glucose Syrup, 16% Water, 0.5% Pectin, 1% Citric Acid, Color, Flavour.<br>Method:<br>1. Blend pectin with 5% sugar, stir into water and heat to 90 deg C.<br>2. Mix fruit pulp, glucose syrup and sugar in a jacketed pan and heat to 90 deg C.<br>3. Add pectin/sugar solution to fruit preparation and boil to 76 Brix.<br>4. Add citric acid solution, color and flavour.<br>5. Pump to depositing tank. |
| CF_3A | Passionfruit Fruit Preparation<br>Supplier: Rudolf Wild GmbH & Co. KG<br>Sample Code: 600040845 |
| CF_3B | Passionfruit Fruit Filling<br>Supplier: Sensient Technologies Pty Ltd<br>Sample Code: CS0324 |
| CF_3C | Passionfruit Fruit Juice Filling<br>Ingredients:<br>45% Glucose Syrup, 20% Sucrose, 19% Water, 13% Passionfruit Juice Concentrate, 1% Pectin, 0.5% Sodium citrate,<br>0.5% Citric Acid, Flavour, Color.<br>Method:<br>1. Heat glucose syrup, water and fruit juice concentrate in a jacketed pan to 65 C. with consistent stirring.<br>2. Add 15% sucrose and cook to 80 C.<br>3. Blend 5% sucrose with pectin and add to boiling mixture in jacketed hopper.<br>4. Cook to 95 C. and hold for 5 minutes, then cool to 70 C.<br>5. Add Citric Acid, Sodium Citrate, color and flavour prior to pumping to depositing tank. |
| CF_3D | Passionfruit Fruit Pulp Filling<br>Ingredients:<br>45% Sucrose, 20% Fruit Pulp, 17% Glucose Syrup, 16% Water, 0.5% Pectin, 1% Citric Acid, Color, Flavour.<br>Method:<br>1. Blend pectin with 5% sugar, stir into water and heat to 90 deg C.<br>2. Mix fruit pulp, glucose syrup and sugar in a jacketed pan and heat to 90 deg C.<br>3. Add pectin/sugar solution to fruit preparation and boil to 76 Brix.<br>4. Add citric acid solution, color and flavour.<br>5. Pump to depositing tank. |
| CF_4A | Pineapple Fruit Preparation<br>Supplier: Rudolf Wild GmbH & Co. KG<br>Sample Code: 600040846 |
| CF_4B | Pineapple Fruit Filling<br>Supplier: Sensient Technologies Pty Ltd<br>Sample Code: CS0327 |

TABLE 2-continued

| SAMPLE NUMBER | FILLING DETAILS |
|---|---|
| CF_4C | Pineapple Fruit Juice Filling<br>Ingredients:<br>45% Glucose Syrup, 20% Sucrose, 19% Water, 13% Pineapple Juice Concentrate, 1% Pectin, 0.5% Sodium citrate,<br>0.5% Citric Acid, Flavour, Color.<br>Method:<br>1. Heat glucose syrup, water and fruit juice concentrate in a jacketed pan to 65 C. with consistent stirring.<br>2. Add 15% sucrose and cook to 80 C.<br>3. Blend 5% sucrose with pectin and add to boiling mixture in jacketed hopper.<br>4. Cook to 95 C. and hold for 5 minutes, then cool to 70 C.<br>5. Add Citric Acid, Sodium Citrate, color and flavour prior to pumping to depositing tank. |
| CF_4D | Pineapple Fruit Pulp Filling<br>Ingredients:<br>45% Sucrose, 20% Fruit Pulp, 17% Glucose Syrup, 16% Water, 0.5% Pectin, 1% Citric Acid, Color, Flavour.<br>Method:<br>1. Blend pectin with 5% sugar, stir into water and heat to 90 deg C.<br>2. Mix fruit pulp, glucose syrup and sugar in a jacketed pan and heat to 90 deg C.<br>3. Add pectin/sugar solution to fruit preparation and boil to 76 Brix.<br>4. Add citric acid solution, color and flavour.<br>5. Pump to depositing tank. |
| CF_5A | Raspberry Fruit Preparation<br>Supplier: Rudolf Wild GmbH & Co. KG<br>Sample Code: 600032847 |
| CF_5B | Raspberry Fruit Filling<br>Supplier: Sensient Technologies Pty Ltd<br>Sample Code: CS0328 |
| CF_5C | Raspberry Fruit Juice Filling<br>Ingredients:<br>45% Glucose Syrup, 20% Sucrose, 19% Water, 13% Raspberry Juice Concentrate, 1% Pectin, 0.5% Sodium citrate,<br>0.5% Citric Acid, Flavour, Color.<br>Method:<br>1. Heat glucose syrup, water and fruit juice concentrate in a jacketed pan to 65 C. with consistent stirring.<br>2. Add 15% sucrose and cook to 80 C.<br>3. Blend 5% sucrose with pectin and add to boiling mixture in jacketed hopper.<br>4. Cook to 95 C. and hold for 5 minutes, then cool to 70 C.<br>5. Add Citric Acid, Sodium Citrate, color and flavour prior to pumping to depositing tank. |
| CF_5D | Raspberry Fruit Pulp Filling<br>Ingredients:<br>45% Sucrose, 20% Fruit Pulp, 17% Glucose Syrup, 16% Water, 0.5% Pectin, 1% Citric Acid, Color, Flavour.<br>Method:<br>1. Blend pectin with 5% sugar, stir into water and heat to 90 deg C.<br>2. Mix fruit pulp, glucose syrup and sugar in a jacketed pan and heat to 90 deg C.<br>3. Add pectin/sugar solution to fruit preparation and boil to 76 Brix.<br>4. Add citric acid solution, color and flavour.<br>5. Pump to depositing tank. |
| CF_6A | Strawberry Fruit Preparation<br>Supplier: Rudolf Wild GmbH & Co. KG<br>Sample Code: 600036779 |
| CF_6B | Strawberry Fruit Filling<br>Supplier: Sensient Technologies Pty Ltd<br>Sample Code: CS0329 |
| CF_6C | Strawberry Fruit Juice Filling<br>Ingredients:<br>45% Glucose Syrup, 20% Sucrose, 19% Water, 13% Pineapple Juice Concentrate, 1% Pectin, 0.5% Sodium citrate,<br>0.5% Citric Acid, Flavour, Color.<br>Method:<br>1. Heat glucose syrup, water and fruit juice concentrate in a jacketed pan to 65 C. with consistent stirring.<br>2. Add 15% sucrose and cook to 80 C.<br>3. Blend 5% sucrose with pectin and add to boiling mixture in jacketed hopper.<br>4. Cook to 95 C. and hold for 5 minutes, then cool to 70 C.<br>5. Add Citric Acid, Sodium Citrate, color and flavour prior to pumping to depositing tank. |
| CF_6D | Strawberry Fruit Pulp Filling<br>Ingredients:<br>45% Sucrose, 20% Fruit Pulp, 17% Glucose Syrup, 16% Water, 0.5% Pectin, 1% Citric Acid, Color, Flavour.<br>Method:<br>1. Blend pectin with 5% sugar, stir into water and heat to 90 deg C.<br>2. Mix fruit pulp, glucose syrup and sugar in a jacketed pan and heat to 90 deg C. |

TABLE 2-continued

| SAMPLE NUMBER | FILLING DETAILS |
|---|---|
| | 3. Add pectin/sugar solution to fruit preparation and boil to 76 Brix. |
| | 4. Add citric acid solution, color and flavour. |
| | 5. Pump to depositing tank. |

TABLE 3

Acid Solutions Used

| Solution ID | ACIDS/SALTS USED | Ratio |
|---|---|---|
| A | Citric | 100% |
| B | Malic | 100% |
| C | Citric/Malic | 90%:10% |
| D | Citric/Malic | 80%:20% |
| E | Citric/Malic | 70%:30% |
| F | Citric/Malic | 60%:40% |
| G | Citric/Malic | 50%:50% |
| H | Citric/Sodium citrate | 80%:20% |
| I | Citric/Sodium citrate | 70%:30% |
| J | Citric/Sodium citrate | 60%:40% |

The liquid jelly confectionery composition is prepared from the formulations outlined in Table 1 using the procedures described in Table 1, and as illustrated in the process flow diagrams. Further details that apply to the Examples and processes illustrated schematically in the Figures are as follows:

Gelling agents that can be pre-mixed with water, such as gelatine and starch, may be pre-mixed with water and held in solution or suspension form, at room temperature or at an elevated temperature, prior to mixing with the other ingredients. In this situation, the calculation of the water in the base recipe is the total water added, including the water component of the gelatine solution or starch slurry, and any water added separately.

The % amounts of ingredients in Table 1 are to several decimal places, based on the weight of ingredient used in the recipe, converted to a % of total ingredients. In practice, the actual amount of ingredients added are not measured to this level of accuracy, and can vary reasonably widely, for example by up to 5%. Thus, these numbers should not be read as requiring a high precision in measuring, and actual test products made to these formulations will have varying amounts of the given ingredients, at amounts within about 5% of the target levels.

The process step referred to as process step 1 in the Figures is a weighing and mixing step. Where there is only one weighing and mixing step at the outset, all ingredients in the base recipe listed (with the optional exception of the fruit juice concentrate, which may be added with the acid, colour and/or flavour) are weighed in appropriate amounts, and mixed. This step may also involve pre-heating, for instance pre-heating to a temperature in the range of about 40-100° C. Pre-heating may be conducted in a single stage, or in multiple stages. As one example, the product may be pre-heated to a temperature in the range of 40-60° C. in a mixing vessel where the raw ingredients are weighed in and mixed, and further pre-heating may occur to bring the temperature to a temperature in the range of 50° C. to 100° C. in a pre-heating vessel, such as a heat exchanger.

Where two mixing/weighing steps 1 are indicated, then some ingredients are weighed and mixed at one stage, prior to a pre-cooking 2a of those ingredients, and then further ingredients are added in the required amounts and mixed in, in a second stage of mixing/weighing, followed by a final cooking stage. Pre-heating can additionally take place prior to pre-cooking or final cooking.

Where pre-cooking is not indicated, the cooking process may involve single-stage cooking in one operation, or it may comprise pre-cooking followed by a final cooking stage. Cooking can be conducted by any suitable means.

Cooling 3 is conducted in any suitable device such as a vacuum chamber. Where carrageenan is the gelling agent, then cooling tends not to take place, as the liquid jelly composition needs to remain quite high in temperature to avoid premature gelling.

In each Figure which shows the inclusion of a process step in which ultrasonic frequency vibrational energy is applied to the jelly stream, a range of different application techniques were explored. These include locating the sonotrode in a holding vessel containing the jelly confectionery composition, locating the sonotrode in a fluid conduit, such as a vertically-oriented fluid conduit, and locating the sonotrode in one of the other process components, such as a mixing chamber or vessel. Where the sonotrode is in a fluid conduit, the sonotrode may be operated only for periods of time required while the liquid jelly confectionery composition is flowing through that conduit.

Where acid addition is referred to, the acid composition is selected from the range of acids referred to in Table 3, at the % level indicated in Table 1. The choice of acid depends on the desired acid profile. It is noted that fruit juice concentrate, where present, can be added with the acid.

Where colour addition is referred to, the colour was selected from commercially available food grade colour known in the art, available from Christian Hansen, Tate & Lyall, Merck, G.N.T, Sensient Technologies, Quest or Givaudan. Colours used have been natural and artificial, water soluble and oil soluble. Other colours may contain agents for shine shimmer or sparkle. The colour is generally selected to be appropriate for a given flavour, but colours that do not reflect the flavour may also be used. The amount of colour used was appropriate to achieve the desired depth of colour. According to several embodiments, the colour addition was to the backing layer only. According to other embodiments, the selected colouring agent was added to both the casing composition and the backing layer. For some products the same confectionery composition was used for the casing and the backing layer, with the same identity and amount of colouring agent used in each. For some other products, additional colouring agent was used for the backing layer to produce a deeper shade of the same colour.

Where flavour addition is referred to, the flavour was selected from commercially available food grade flavours known in the art, available from Sensient Technologies, Firmenich, Givaudan, Essential Flavours and Ingredients, Selesia/Orica, Kerry Ingredients, International Flavours and Fragrances and Quest International. The Flavours used have been natural, artificial and nature-identical, water soluble and oil soluble. The choice of flavour was selected based on the desired flavour for the product, and the amount was based on the strength of the flavour itself (natural flavours tend to be less strong per unit volume or weight), and the desired strength of flavour in the product. In the case of centre-filled confectionery products, the casing flavour was on occasion selected to be consistent with the flavour of the centre filling (i.e. raspberry flavour for the casing was used when the filling was raspberry in flavour) and on other occasions selected to be different (e.g. lemon for casing and raspberry for filling).

In each Example that correlates to a process flow diagram which illustrates a centre filling supply hopper 8, from which a centre filling can be delivered to a centre-filling hopper 9 of the depositor, the centre fillings are as outlined in Table 2. A range of different centre fillings, of different flavours and consistencies, are used in producing a range of flavoured and coloured filled and unfilled products within each Example. In the experiments performed, the centre fillings were deposited at a range of temperatures suitable to the consistency of the filling, and compatible with the temperatures of the outer shell depositing temperatures. The temperatures utilised were between 40° C. and 85° C. Several examples prepared with a centre filling were performed with a centre filling deposition temperature within the range of 50 to 65° C.

In the production of one range of test products within each Example, the liquid jelly confectionery materials outlined in the Table of Casing Formulations (Table 1) were left uncoloured for forming the outer casing, and were coloured with up to 4% of a colouring agent to form the backing layer. The centre filling is one of the centre fillings outlined in Table 2. In another range of test products produced within the Examples, the casing was coloured. In a third range of test products, the casing was coloured with a colouring agent, and the same colouring agent was added at a greater concentration to the backing layer. In further test products produced within the Examples, the jelly composition was not centre-filled, and in this case the liquid jelly composition had acid, colour and flavour added. In other product lines within the Examples, the casing is a foamed casing, with a centre filling. In yet a further product line, the casing and backing contain the following agents:

| Casing component | Backing component |
| --- | --- |
| Colour pigment at a concentration to give a light colour | Same colour pigment as for the casing, but at a greater concentration to give a darker intensity of the same colour. |
| Colour pigment at a concentration to give a light colour | Different colour agent compared to the casing, of a similar colour, at a concentration that provides a darker colour intensity. |
| Candurin ® (Merck) silver fine (satin shine) pigment | A colour pigment that gives a colour effect only. |
| A colour pigment that gives a colour effect only. | Candurin ® (Merck) gold lustre (gold pearl effect) pigment |
| Micro-encapsulated flavour beads | A colour pigment that gives a colour effect only. |
| Two pigments used to colour two different confectionery streams, to produce a starlight effect, each being used at a concentration to give the desired colour intensity for each stream. | One of the two pigments, at the same concentration or a different concentration as used to produce the starlight effect in the casing. |
| Two pigments used to colour two different confectionery streams, to produce a starlight effect, each being used at a concentration to give the desired colour intensity for each stream. | A different pigment compared to the two pigments used to produce the starlight effect, at a concentration to produce the desired colour intensity. |
| Two pigments used to colour two different confectionery streams, to produce a starlight effect, each being used at a concentration to give the desired colour intensity for each stream. | Candurin ® (Merck) red lustre (red pearl effect) pigment |
| No pigment, but use of foaming to create a white opaque case | Colour pigment at a concentration to give the desired colour intensity |
| No pigment, but use of foaming to create a white opaque case | Colour pigment and Candurin ® (Merck) Silver Sheen (silk shine) pigment |
| A colour pigment and the use of foaming to create a coloured opaque casing of the desired depth of colour. | Colour pigment at a concentration to give the desired colour intensity. |
| Colour pigment and Candurin ® (Merck) Silver Lustre (brilliant shine) pigment | A colour pigment of the same colour and concentration as in the casing, but no Candurin Silver Lustre pigment |
| Colour pigment and Candurin ® (Merck) Silver Sheen (silk shine) pigment | A different colour pigment, and of a different colour compared to the casing, at a concentration to give the desired colour intensity. |
| A colour pigment at a concentration to give the desired depth of that colour | A combination of the same colour pigment as in the casing and Candurin ® (Merck) Silver Fine (satin shine) pigment. |
| A colour pigment at a concentration to give the desired depth of that colour | A combination of a different colour pigment compared to the casing and Candurin ® (Merck) Silver Fine (satin shine) pigment. |

After addition of the acid to the liquid jelly confectionery composition, the liquid jelly confectionery composition was transferred to one or more of hoppers 11, 12, 13 and 14. The temperature of the hoppers are held at the set deposition temperature for that stream of liquid jelly confectionery material, as indicated in Table 1. The liquid jelly confectionery composition was held in the relevant hopper over a range of sample time periods following the application of ultrasonic energy and addition of acid, as described in the detailed description. The time taken for the liquid jelly confectionery composition to pass to the hoppers after addition of acid and/or ultrasonic energy application was relatively quick, such as less than 15 minutes, or less than 5 minutes. The majority of the time period between application of acid and/or application of ultrasound frequency vibrational energy and deposition is time spent in the hopper. The hopper for the centre filling is generally held at a temperature corresponding to its deposition temperature.

Where centre-filled jellies are produced, these are produced in a standard one-shot depositor including a one-shot nozzle plate 17 into a starch moulding mogul tray 18 imprinted with the desired product shape. In other embodiments, a "starlight" nozzle plate 16 is utilised to produce unfilled jellies from two different coloured liquid jelly compositions with a star-shaped pattern. In other embodiments, a standard single depositing nozzle plate 19 is utilised to deposit a single liquid jelly confectionery composition to produce an unfilled, standard jelly product.

The use of two shell depositor hoppers enables the manufacturer to produce two different flavoured and/or coloured product lines at the same time, through depositing liquid jelly confectionery composition from one hopper 11 into half of the moulds, and from the other hopper 12 into the other half of the moulds at the same time. Where the product is a centre-filled product, the centre filling can be two different centre fillings (deposited from hoppers 9 and 10, respectively), or they can be the same filling.

After depositing of the centre-filling encased by the casing or shell into the starch mould, this product in the starch moulding mogul tray 18 passes under a second depositing station beneath a bottoming (or backing off) depositor hopper 13 and/or 14. A coloured backing layer jelly confectionery composition is deposited onto the one-shot deposited product. According to some examples, the backing layer is uncoloured, but foamed. Two hoppers may be employed, so that backing off layers of confectionery material of different compositions can be applied to half of the products in the mogul tray at the same time.

Sonication Results

In-line sonication of the jelly formulations tested (as outlined in Table 1) with an amplitude of between 50-100%, using a 1 kW sonotrode system, 24 kHz frequency, resulted in viscosity reductions of 30-60% (cP) on products of around 69-74% total solids. This was achieved at a product flow rate of approximately 30 kg/min. It is noted that in commercial scale operations, it is likely that a higher powered sonotrode would be used, to allow for a higher throughput of liquid jelly confectionery composition, whilst applying the same energy of between 0.5 and 20 W·s·ml$^{-1}$. It is noted that liquid jelly confectionery compositions tend to weigh between 1.3-1.4 g/ml, thus enabling this calculation to be converted into W·s·g$^{-1}$.

Of the three sonotrode systems trialed (e.g. nozzle plate, immersion in hopper, in line system) the in-line system appears to offer the most practical solution for continuous jelly production systems. 75% solids were the highest solids achieved in one trial with complete starch gelatinization, although higher solids were achieved with incomplete starch gelatisation. Typical manufacturing starting total solids (%) is 71, finishing at 81% TS and bagging (sealing of the product in a container, such as a bag) at 85%.

The viscosity reduction in jellies that is obtained with the use of ultrasonics is seen to hold for about 30 minutes post it application of the ultrasonic energy. After this time period the jelly viscosity reverts back to its original higher value.

78% total solids jellies have been achieved using a standard flowcell, radial sonotrode, with no booster and no backpressure (product flow 2 kg/min), 100% amplitude. The measured viscosity was equivalent to non-sonicated jelly of 73% total solids.

The product stream sonication points depicted in the Figures are only examples of the potential sonication points. It is also possible to employ a sonotrode in batch or mixing tank(s) and/or slurry tanks—such as a starch slurry tank, where the gelling agent is starch.

Sonciation can also be applied during the cooking process. The advantages of using ultrasonics include the reduction in heat required to initiate gelling leading to possible improved product quality. As previously stated the advantages of higher solids processing derives from savings at the drying stage hence drier programs and technology (downstream processing) was investigated for reasons that included understanding the drying time to solids relationship.

It will be understood to persons skilled in the art of the invention that many modifications may be made to the embodiments and examples described without departing from the spirit and scope of the invention.

The invention claimed is:

1. A method for making a jelly confectionery comprising:
preparing a liquid jelly confectionery composition comprising bulk sweetener and a hydrocolloid gelling agent,
cooking the liquid jelly confectionery composition, and
depositing the liquid jelly confectionery composition into a mould, wherein ultrasound frequency vibrational energy is applied to the liquid jelly confectionery composition prior to deposition.

2. The method of claim 1, wherein the ultrasound frequency vibrational energy is applied by sonication.

3. The method of claim 1, wherein the ultrasound frequency vibrational energy is applied by a sonotrode which comprises a probe located in the flow of jelly confectionery material, a nozzle plate sonotrode or a sonication chamber.

4. The method of claim 1, wherein the ultrasound frequency vibrational energy is applied by an in-line sonotrode located in a conduit through which the liquid jelly confectionery composition passes.

5. The method of claim 1, wherein the frequency of the ultrasound frequency vibrational energy is between 20 kHz and 100 kHz.

6. The method of claim 1, wherein the ultrasound frequency vibration energy is applied at between 0.5 and 20 W·s·ml$^{-1}$.

7. The method of claim 1, wherein the power rating applied by ultrasound frequency vibrational energy is between 0.1 and 20 kW.

8. The method of claim 1, wherein the amplitude of the ultrasound frequency vibrational energy between 50% and 100%.

9. The method of claim 1, wherein the ultrasound frequency vibrational energy is applied to the liquid jelly confectionery composition to reduce the viscosity of the liquid jelly confectionery composition by at least 10% compared to the viscosity immediately preceding the application of the ultrasound frequency vibrational energy.

10. The method of claim 1, wherein the ultrasound frequency vibrational energy is applied following cooking and before deposition of the liquid jelly confectionery composition.

11. The method of claim 1, wherein the ultrasound frequency vibrational energy is applied within 30 minutes prior to deposition.

12. The method of claim 1, wherein the ultrasound frequency vibrational energy is applied after addition of acid.

13. The method of claim 1, wherein the deposition step comprises depositing the liquid jelly confectionery composition at a solids content of greater than 71% solids.

14. The method of claim 13, wherein the deposition step comprises depositing the liquid jelly confectionery composition at a solids content in the range of about 73%-82%.

15. The method of claim 1, further comprising stoving of the liquid jelly confectionery composition, wherein the stoving cycle time is reduced by at least 30% compared to the same process performed without the application of ultrasonic energy.

16. The method of claim 1, wherein the step of preparing a liquid jelly confectionery composition comprising bulk sweetener and a hydrocolloid gelling agent comprises mixing a bulk sweetener selected from the group consisting of sugar-based sweeteners, sugarless sweeteners and mixtures thereof with the hydrocolloid and water.

17. The method of claim 1, wherein the jelly confectionery is a centre-filled jelly confectionery, and the method further comprises co-depositing a centre filling with the liquid jelly confectionery composition, which forms the outer casing around the centre filling.

18. A method of claim 1, wherein the jelly confectionery is centre-filled jelly comprising:
- a centre filling,
- a jelly casing, and
- a jelly backing layer, applied to one side of the jelly casing;

the method comprising:
- preparing a liquid jelly confectionery composition comprising bulk sweetener and a hydrocolloid gelling agent,
- cooking the liquid jelly confectionery composition,
- dividing the cooked liquid jelly confectionery into at least two streams,
- applying ultrasound frequency vibrational energy to the liquid jelly confectionery composition used to form the jelly casing prior to co-depositing,
- co-depositing the first stream of liquid jelly confectionery composition with a coloured centre filling into a mould, with the liquid jelly confectionery composition forming jelly casing around the centre filling, and
- applying a jelly backing layer formed from the second stream of liquid jelly confectionery composition to the co-deposited product to form the centre-filled jelly.

* * * * *